(12) United States Patent
Krefman

(10) Patent No.: US 8,147,063 B2
(45) Date of Patent: Apr. 3, 2012

(54) METHOD FOR MINIMIZING PRISM IN OVER-THE-COUNTER EYEGLASSES AND OPTICAL DEVICES

(75) Inventor: Ronald Krefman, Highland Park, IL (US)

(73) Assignee: OTC Optics LLC, Lake Bluff, IL (US)

( * ) Notice: Subject to any disclaimer, the term of this patent is extended or adjusted under 35 U.S.C. 154(b) by 188 days.

(21) Appl. No.: 12/511,996

(22) Filed: Jul. 29, 2009

(65) Prior Publication Data
US 2010/0020286 A1 Jan. 28, 2010

Related U.S. Application Data

(63) Continuation-in-part of application No. 11/408,205, filed on Apr. 21, 2006, now Pat. No. 7,568,798.

(51) Int. Cl.
G02C 7/02 (2006.01)
(52) U.S. Cl. .................. 351/177; 351/159; 351/204
(58) Field of Classification Search .................. 351/159, 351/204
See application file for complete search history.

(56) References Cited

U.S. PATENT DOCUMENTS

| 1,090,232 | A |   | 3/1914  | Riggs |
|---|---|---|---|---|
| 4,033,678 | A |   | 7/1977  | Rudd |
| 4,561,739 | A |   | 12/1985 | Okazaki |
| 4,591,246 | A |   | 5/1986  | Cousyn et al. |
| 4,762,406 | A |   | 8/1988  | Steiner |
| 4,898,459 | A |   | 2/1990  | Eriksson |
| 5,084,781 | A |   | 1/1992  | Gregorio |
| 5,100,006 | A |   | 3/1992  | Forrester |
| 5,499,063 | A |   | 3/1996  | Butler et al. |
| 5,537,249 | A |   | 7/1996  | Masunaga et al. |
| 5,682,220 | A |   | 10/1997 | Sherman et al. |
| 5,694,194 | A |   | 12/1997 | Morrison |
| 5,724,258 | A | * | 3/1998  | Roffman ................. 702/108 |
| 5,808,720 | A |   | 9/1998  | Morrison |
| 5,867,246 | A |   | 2/1999  | Edwards et al. |
| 5,897,184 | A |   | 4/1999  | Eichenlaub et al. |
| 6,062,691 | A |   | 5/2000  | Markson |
| 6,183,081 | B1 |  | 2/2001  | Ono et al. |
| 6,258,494 | B1 |  | 7/2001  | Bourdelais |
| 6,511,181 | B1 |  | 1/2003  | Fujieda |
| 6,910,769 | B2 |  | 6/2005  | Renard |
| 7,064,271 | B1 |  | 6/2006  | Gretz |
| 7,066,597 | B2 |  | 6/2006  | Miller et al. |
| 7,224,382 | B2 |  | 5/2007  | Baker |
| 7,242,522 | B2 |  | 7/2007  | Kanai |
| 7,357,505 | B2 |  | 4/2008  | Renard |
| 2003/0123026 | A1 | * | 7/2003 | Abitbol et al. ............. 351/204 |
| 2003/0189687 | A1 | * | 10/2003 | Renard .................... 351/159 |
| 2006/0238705 | A1 | * | 10/2006 | Renard .................... 351/204 |

OTHER PUBLICATIONS

Dr. Claire C. Gordon, 1988 Anthropometric Survey U.S Army Male Working Data Base—Natick/TR, 1988, 89: TR 89/027.
Pryor, H.B., Pediatrics, 1969, 44:973-7.
Murphy, W.K., Oral Surg. Oral Med. Oral Path., 1990, 69:676-80.
Barretto, R., The Laryngoscope, 1999, 109:1051-4.
Pointer, J.S., Ophthal. Physiol. Opt., 1999, 19:317-26.

(Continued)

Primary Examiner — Jordan Schwartz
(74) Attorney, Agent, or Firm — Katten Muchin Rosenman LLP

(57) ABSTRACT

The invention is directed to over the counter (OTC) eyeglasses with improved optical center distance (OCD) settings. The improved settings include a single best OCD setting by gender for the eyeglasses. Alternatively, plural pairs of eyeglasses, having different OCD settings are provided for purchase.

25 Claims, 4 Drawing Sheets

OTHER PUBLICATIONS

Evereklioglu, C., Cleft Palate-Craniofacial Journal, 2002, 39:208-18.
MacLachlan, C., Ophthal. Physiol. Opt., 2002, 22: 175-82.
Ditmars, D.L., J. Am. Optometric Assn., 1966, 37:361-3.
Fledelius, H. C., Acta Ophthalmol., 1986, 64:481-6.
Jonasson, F., Acta Ophthalmologica., 1987, 65:44-47.
McCormack, G., Am. J. Optom. Physiol. Optics., 1982, 59:60-66.

* cited by examiner

US 8,147,063 B2

METHOD FOR MINIMIZING PRISM IN OVER-THE-COUNTER EYEGLASSES AND OPTICAL DEVICES

CROSS REFERENCE TO RELATED APPLICATIONS

This application is a continuation-in-part of and claims priority benefit of U.S. patent application Ser. No. 11/408,205, filed Apr. 21, 2006, now U.S. Pat. No. 7,568,798 the contents of which are incorporated herein by reference in their entirety.

FIELD OF INVENTION

The present invention relates to over-the-counter (OTC), ready-made eyeglasses and a display therefore. More particularly, the invention relates to a method for calculating the best optical center distances (OCDs) for optimizing ready-made reading glasses to minimize detrimental aberrations. The invention also relates to a plurality of eyeglasses wherein a first pair of eyeglasses has a different optical center distance (OCD) relative to a second pair of eyeglasses. The invention also relates to a pair of eyeglasses for reading with a single OCD for each gender, that is 60.47 mm for women, 63.19 mm for men and 61.36 mm for both genders combined.

BACKGROUND OF THE INVENTION

Ready-made reading glasses are made and sold in assorted magnifications to allow wearers to choose the proper magnification for their requirements. The magnification is a measure of the diopter or focusing power of the lenses contained within each pair of eyeglasses. All diopter lenses have undesirable aberrations and prismatic effects which are encountered if viewed through any point away from the lens optical center. Viewing through significant aberrations and prism may cause eye fatigue, eyestrain, blurred vision, headaches, loss of concentration and difficulty reading or doing prolonged "near work" with eyeglasses. For that reason, guidelines have been set forth by the International Organization for Standardization (ISO) that call for horizontal prism tolerances of $0.66\Delta$s (cm/m, abbreviated as: $\Delta$) per pair, or less to ensure comfortable vision. One particular standard of interest is ISO 16034: "Ophthalmic optics—Specifications for single-vision ready-to-wear near-vision spectacles". This standard provides the prism threshold for optimized vision by comparing any OCD setting a manufacturer may specify to the OCD of the finished reading glasses. While this standard as a quality control guideline is laudable, it has a serious flaw: failing to take into account that the OCD chosen by a manufacturer may be flawed, as it is potentially a mismatch for the over the counter consumer purchasing the product.

Aberrations and prism increase as a result of two constraints: 1) the diopter power (higher power lenses contain more aberrations and prism), and 2) the position of the line of vision relative to the optical center of the lens (looking through the inner or outer edge of the lens induces more aberrations and prism than looking through the optical center). If the wearer is looking through the optical centers of the lenses, then the aberrations and prism are minimized. However, if the wearer's eyes are spaced farther or closer than the specified OCD, excessive prism will occur. Thus, a manufacturer may specify an OCD setting that is too narrow or too wide for the majority of people, yet still pass this quality control standard. The ISO standard only requires that the eyeglasses are made according to the manufacturer's specification. Prior art and the ISO standard fail to recognize that the key to limiting prism to $0.66\Delta$ or less while the glasses are being worn lies in proper OCD specification to accommodate the majority of wearers. Until the present disclosure, OCD settings have never been optimized to limit excessive prism from occurring for the range of wide to narrow eye spacings that are typical in the population.

Custom made prescription eyewear addresses the prism problem as each pair is made to ensure that unwanted aberrations and prism are minimized at the lens optical center. This is accomplished by the optical provider first measuring the user's separation between left and right eye, or pupillary distance (PD). FIG. 1. illustrates the pupils 1a and 1b and the PD 2a. Once the PD is known, then the prescription eyeglasses are custom made to match the separation between the optical centers to the user's PD.

Each lens, 3a and 3b as illustrated in FIG. 2, is mounted into an eyeglass frame held by lens mountings 6a and 6b. The lens 3a and 3b placement within the lens mounting 6a and 6b determines where the lens optical centers 4a and 4b are positioned. Ideally, the optical centers 4a and 4b will coincide with each of the user's pupils. In prescription eyeglasses, the optical provider is careful to mount the lenses 3a and 3b so that the optical centers 4a and 4b are positioned directly in front of the user's pupils. Hence, the OCD 5a matches the PD, resulting in minimal aberrations and prism as the wearer gazes straight ahead, as shown in FIG. 3.

However, in ready-made reading glasses, as seen in FIG. 4, the pupils 4a and 4b may be spaced such that the PD 2b may be wider than the pre-set OCD 5a between optical centers 4a and 4b. Or, as seen in FIG. 5, the pupils 4a and 4b may be spaced such that the PD 2c may be narrower than the pre-set OCD 5a between optical centers 4a and 4b. Discrepancies between PD and OCD create unwanted prism and aberrations.

In contrast to custom made prescription eyewear, OTC, ready-made eyeglasses, have a pre-set OCD such that only one OCD is offered by sellers. As the PD is known to vary greatly in the general population, and ranges from 45 millimeters (mm) to 80 mm, a single OCD cannot cover the range of normally occurring PDs.

The manufacturer selected, pre-set OCD setting has typically been one size to fit all, and the particular setting chosen by various suppliers varies widely with no stated rationale for selection of their particular OCD setting. Presumably, purveyors of readymade reading glasses believe the OCD setting that they specify is in agreement with the "average" PD of the population they intend to serve. Until the present invention, there was no agreement about the average, nor proper setting to choose, nor an identified way to scientifically calculate the best solution. Thus, the prior art shows a wide disparity in the OCD settings among the reading glasses offered by the various suppliers. And, the OCD setting(s) chosen for readymade reading glasses have not been ideal for optimizing vision for the greatest number of people. A study (see Refraction and Interpupillary Distance Measurements, Acta Opthalmol, 65:44-47) of 555 subjects found that available OTC ready-made reading glasses were unsuitable for nearly 14.2% of the population. Further evidence that there is no agreed nor accepted value for best OCD setting(s), lies in an independent optical testing laboratory report (see Test Results and Report Colts Laboratory O-EMA 111507) which widely sampled more than 450 reading glasses from 8 different vendors and discovered a different mean OCD setting for each vendor, ranging widely, from 54 to 64 mm.

Thus, OTC, ready-made eyeglasses comprise excessive aberrations and prism for some wearers of eyeglasses. Aberrations and prism are more pronounced if the user requires higher powered eyeglasses or has a PD significantly wider or narrower than the offered pre-set OCD. Thus, some wearers are exposed to more aberrations and prism and may experience eyestrain or other symptoms such as impaired task performance, lower reading comprehension, headaches, and even neck and back pains.

Hence, given the wide variation in eye spacings, no single OCD setting is capable of minimizing aberrations and prism for all PDs. Yet, it is impossible to offer OTC readymade reading glasses to exactly match each and every PD setting, as the cost, inventory and space required would be prohibitive. Recognizing the fact that OTC readymade reading glasses with preset OCDs create prism and aberration, the New York State Optometric Council strongly opposed the over-the-counter sale and use of readymade reading glasses citing the failure to have lenses optically centered with the PD (see Sep. 2, 1988 memorandum in opposition to NY State Reading Glass law enactment). Similarly, the New York State Society of Opticians raised concern that with discrepancies between PD and OCD, readymade reading glasses result in unwanted prismatic effects causing double vision, eyestrain and headaches (see Aug. 25, 1988 letter opposing NY State Reading Glass law enactment). Yet, despite these protestations, the economic benefits of readymade reading glasses (less expensive and more readily available than custom made prescription eyeglasses) have outweighed the optical handicaps.

U.S. Pat. No. 4,762,406 reveals sliding moveable lenses in reading glasses as a means to position the OCD to accommodate the breadth of variations in PDs that occur in reading glasses users. This is a simple and elegant means of properly aligning the visual axes of the wearer with the optical centers of the lenses, thus limiting or eliminating undesirable prism and its problematic side effects. However, the sliding feature is subject to user error and repeated misalignment. Thus, the user of the glasses described in '406 are subject to periodic and multiple readjustments, and if not aligned properly, these reading glasses can cause more harm than good by creating excessive prism, the opposite effect of their intended use. Thus, there remains a great need for discovery of the best fixed OCD setting(s) that will minimize prism effects for the greatest number of wearers.

U.S. Pat. Nos. 7,357,505, 6,910,769 and 4,898,459 describe how to measure the PD of the wearer utilizing various devices and means. However, until the present invention, discovering a given user's PD for OTC reading glasses was an exercise in futility, as the optimum OCD settings for OTC reading glasses has never been identified. Until the present disclosure, there was no knowledge among manufacturers and vendors of readymade reading glasses as to a method for determining the best OCD or OCDs that will be suitable for the greatest number of people and maximizing their vision and comfort while maintaining a limited and practical number of offerings thus limiting costs, inventory and space requirements. The method for calculating the best OCD specifications is the solution to minimizing the troublesome prism that occurs from a mismatch of PD and OCD.

U.S. Pat. Nos. 6,910,769 and 4,898,459 both disclose reading spectacles comprising a film overlay. The overlay enables a person to identify a pair of spectacles having the correct optical center (i.e., OCD) to match the wearer's pupillary separation (i.e., the PD). The '769 patent discloses a combination of a pair of spectacles having two near focal powers and a type of display mechanism that allows the purchaser to choose not only the correct power needed, but also the correct pair of glasses to match the user's PD. Optical centers of finished reading glasses are marked at the place of manufacture, then a display device including an opaque polyvinyl static cling film having two holes therein is placed onto the lenses, at the place of manufacture, such that the holes in the film overlie the optical centers. When the user dons the glasses, if a solid round area is viewed, the spectacles have the correct size for the user's PD. If a figure eight or two holes is viewed, the PD is too wide. If the user views the outside edges, the PD is too narrow. By visual observation, the user can find the correctly sized reading glasses. Similarly, the spectacles disclosed in the '459 patent comprise an opaque film that allows the user to test suitability of the spectacles for their PD.

The eyeglasses comprising the film described in the '769 and '459 patents are made using a process that is expensive and interferes with vision while the user tries on the eyeglasses and attempts to look through the film. Therefore, there is a need for OTC ready made eyeglasses that do not comprise such a film and that can accommodate a variety of PDs, for single vision, bifocal and multifocal reading glasses, thus minimizing the aberrations and prism thereby increasing the comfort and wearability of the eyeglasses. Moreover, there is a greater need for a method and the results derived there from for determining which of the many possible OCD setting(s) are most capable of limiting prism for the majority of OTC readymade reading glass users. The present invention provides a method for determining the best OCDs to optimize vision in readymade reading glasses, and also provides for the practical application of the results and outcomes derived from implementation of this method.

SUMMARY OF THE INVENTION

The invention is directed to a novel method that teaches the best OCD setting(s) that will minimize prism in readymade reading eyeglasses for the spectrum of PDs that naturally occur in the targeted human population. The method reveals steps and formulas to arrive at best OCD setting(s) that minimize prism to the greatest extent for the highest possible percentage of the target population with the fewest number of unique settings.

In one aspect, the invention is directed to a novel combination of structure and/or function whereby eyeglasses are provided, each comprising: two static lenses; wherein: a first pair of eyeglasses has a first lens and a second lens wherein said first lens and second lens each have a first optical center and a second optical center, respectively, that are spaced at a first OCD; and a second pair of eye glasses has a third lens and a fourth lens wherein said third lens and fourth lens each have a third optical center and a fourth optical center, respectively, that are spaced at a second OCD, wherein said first OCD is different from said second OCD each of the plurality of pairs of eyeglasses being uncovered by any layer that is releasably attached to the two static lenses of any of the plurality of pairs of eyeglasses.

In another aspect, the invention is directed to a novel combination of structure and/or function whereby an eyeglass display is provided for the display of a plurality of pairs of eyeglasses comprising: a plurality of holders configured to removably retain the plurality of pairs of eyeglasses; a plurality of pairs of eyeglasses, each comprising: two static lenses; wherein: a first pair of eyeglasses has a first lens and a second lens wherein said first lens and second lens each have a first optical center and a second optical center, respectively, that are spaced at a first OCD; and a second pair of eye glasses has a third lens and a fourth lens wherein said third lens and fourth lens each have a third optical center and a fourth optical center, respectively, that are spaced at a second OCD, wherein said first OCD is different from said second OCD each of the plurality of pairs of eyeglasses being uncovered by any layer that is releasably attached to the two static lenses of any of the plurality of pairs of eyeglasses.

In yet another aspect, the invention provides a method for displaying a plurality of pairs of eyeglasses on a display comprising: arranging a plurality of pairs of eyeglasses on a display, wherein the display comprises a plurality of placeholders that removably retain the plurality of pairs of eyeglasses; and wherein each of the plurality of pairs of eyeglasses comprises: two static lenses; wherein: a first pair of eyeglasses has a first lens and a second lens wherein said first lens and second lens each have a first optical center and a second optical center, respectively, that are spaced at a first OCD; and a second pair of eye glasses has a third lens and a fourth lens wherein said third lens and fourth lens each have a third optical center and a fourth optical center, respectively, that are spaced at a second OCD, wherein said first OCD is different from said second OCD each of the plurality of pairs of eyeglasses being uncovered by any layer that is releasably attached to the two static lenses of any of the plurality of pairs of eyeglasses.

In another aspect, the invention provides a method for determining the OCD(s) for a plurality of pairs of eyeglasses, comprising: at most three optical center distances (OCDs) wherein: the OCDs are configured for a specific reading distance to accommodate at least 95% of the population or all persons within two standard deviations of the weighted mean NPD of the specified adult human population, while making allowances for race, gender and at any Diopter power of the plurality of pairs of eyeglasses.

In yet another aspect, the invention provides a method for determining the OCD (s) for a plurality of pairs of eyeglasses, comprising: at most two optical center distances (OCDs) per gender (male, female, and unisex) wherein: the OCDs vary by Diopter and are configured for a specific reading distance to accommodate a largest percentage of the adult human population with a least amount of prism, while making allowances for race, gender and at any Diopter power of the plurality of pairs of eyeglasses.

In another aspect, the invention provides a method for determining the OCD(s) for a plurality of pairs of eyeglasses, comprising: at least two optical center distances (OCDs) wherein: the OCDs are selected for a specific viewing distance to reduce the prism for a greater segment of the near pupillary distances (NPDs) occurring in the specified adult human population, while making allowances for race, gender and at a given range of Diopter powers of the plurality of pairs of eyeglasses, than could occur with a single OCD setting.

In yet another aspect, the invention provides a plurality of pairs of eyeglasses, comprising at least a first pair of eyeglasses that has a first lens and a second lens wherein the first lens and second lens have a first optical center and a second optical center, respectively, that are spaced at a first optical center distance (OCD); and a second pair of eyeglasses that has a third lens and a fourth lens wherein the third lens and fourth lens have a third optical center and a fourth optical center, respectively, that are spaced at a second optical center distance (OCD); thereby providing at least two optical center distances (OCD's) wherein the OCDs are selected for a specified reading distance to reduce the prism for a greater segment of the NPDs occurring in the adult human population than could occur with a single or multiple OCD settings selected by other means, while minimizing the inventory requirements, and wherein the OCDs may vary with gender, race, reading distance and Diopter power.

As used herein, the term "placeholder" or "placeholders" means any device that may be used to hold the eyeglasses on the eyeglass display. The holder 400 may, as shown in FIG. 6 for example, comprise a support 401 on which the nosepiece 402 of the eyeglasses rests and perforations 403 and 404 in the display through which the temples 405 of the eyeglasses 406 fit. Alternatively, the holder may be, for example, a segment of Velcro™ that is removably affixed to the eyeglasses and to the display and thus removably retains the eyeglasses on the display. In yet another alternative, the holder may be a magnetic holder that is imbedded in the eyeglasses (e.g., in the frame). The eyeglasses are then held on a display comprising metallic surfaces to which the eyeglasses are retained via magnetic forces.

The eyeglasses 406 held on the holder may bear a removably or permanently affixed indicia, such as a label 407 on the lens 408 of the eyeglasses in FIG. 6, indicating the OCD in measured units (e.g., millimeters or inches), or indicating an assumed name for OCD such as "Narrow" or "Medium" or "Wide" or it may indicate the PD, or range of PDs either in measured units (e.g., millimeters or inches), or an assumed name for PD or range of PDs such as "Narrow" or "Medium" or "Wide" that will be satisfied by the eyeglasses. The indicia, however, may be located anywhere on the eyeglasses (e.g., at the temples 405) and may be permanent or removably affixed to the eyeglasses by any means known in the art. In addition, the indicia may be located anywhere on the display such that the user will know from looking at the indicia that the eyeglasses he/she is selecting fit their particular PD.

As used herein, the term "static lenses" two individual and separate lenses that are neither slideable nor removable; that is, the lenses are not slideable such that the lenses may be moved in any way with respect to the frames to change the location of the optical center of the eyeglasses relative to the PD of the person wearing the eyeglasses. See, e.g., U.S. Pat. No. 4,762,406. The term also refers to a pair of lenses embodied within a one piece molded lens unit.

As used herein, the term "temple" or "temples" refers to any device for securing the eyeglasses to the head of the user.

As used herein, the term "nosepiece" refers to any device for supporting the eyeglasses before the eyes of the user.

BRIEF DESCRIPTION OF THE DRAWINGS

Further features and objects of the present invention will become apparent to those skilled in the art to which the invention relates from a reading of the following specification with reference to the accompanying drawings.

DETAILED DESCRIPTION OF THE INVENTION

I. Introduction

Figure 1:
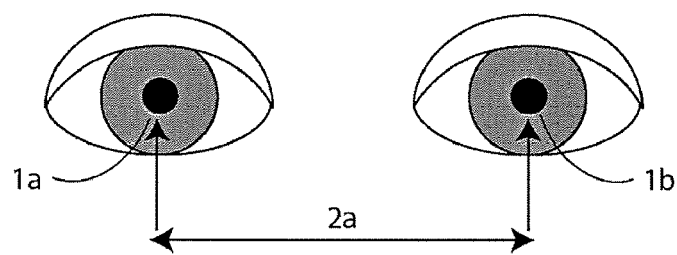
FIG. 1 presents a diagram showing two eyes comprising two pupils and the distance between the two pupils (i.e., the pupillary distance, PD).
Figure 2:
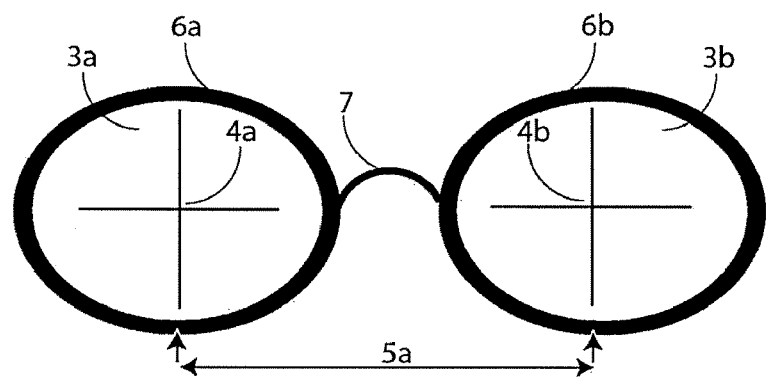
FIG. 2 presents a diagram showing eyeglasses with the optical centers denoted by the centers of the cross-hairs.

Known OTC, ready-made reading eyeglasses do not consider the variability in PD spacing between people's eyes. Presently available OTC, ready-made eyeglasses, have an OCD that is pre-set. Currently, the OCDs offered by each commercial seller of OTC eyeglasses are, on average, unsuitable for more than 40% of the population. The present invention teaches a new method that enables discovery of the best OCD setting(s) to minimize prism. The method incorporates new variables in determining the best OCD(s), namely: population prevalence of NPD by gender and race, reading distance, and Diopter power. The novel method presented herein teaches how to minimize prism with the fewest number of glasses for as many users of readymade reading glasses as possible. The breakthrough includes a meta-analysis of PD measurements by race and gender with an algorithm that incorporates population prevalence of these new variables and presents a new method to calculate the weighted mean PD settings and standard deviations for each target population, which then utilizes iterative optical calculations in a new way to establish the amount of prism that occurs at each intersection across the plethora of possible Diopter/PD/OCD combinations. The results of each calculation are compared to establish the optimum OCD setting(s) that create below threshold prism for the greatest percent of the population. The end result is the benefit of precise OTC readymade reading glasses with significantly lower prism and distortion levels than have previously been available. This means that users of OTC readymade reading glasses can wear the most accurate optical lenses, allowing them less eyestrain and more productivity. It is noted that the method of the present invention may also be advantageously applied with respect to other optical devices, including sunglasses, safety glasses, and binocular optical instruments such as stereoscopes, binoculars, and microscopes.

As PD is known to vary with age, gender and race, the algorithm requires appropriate census data adjusted and sorted for age appropriate users of reading glasses, by gender and race. PD measurement and standard deviation data from a comprehensive literature review encompassing 13 independent surveys covering PD measurements of approximately 28,000 people were parsed and sorted to calculate the weighted means and standard deviations for each target group (gender and race) through application of the following steps beginning with calculation of the weighted mean PD for each gender and race. See Gordon, C. C., NATICK/TR, 1988, 89: TR 89/027; Pryor, H. B., Pediatrics, 1969, 44:973-7; Murphy, W. K., Oral Surg. Oral Med. Oral Path., 1990, 69:676-80; Pivnick, E. K., Clini Genet, 1999, 55:182-191; Barretto, R., The Laryngoscope, 1999, 109:1051-4; Pointer, J. S., Ophthal. Physiol. Opt., 1999, 19:317-26; Evereklioglu, C., Cleft Palate-Craniofacial Journal, 2002, 39:208-18; MacLachlan, C., Ophthal. Physiol. Opt., 2002, 22:175-82; Thompson, P., Perception, 2002, 31:651-6; Ditmars, D. L., J. Am. Optometric Assn., 1966, 37:361-3; Fledelius, H. C., Acta Opthalmol., 1986, 64:481-6; Jonasson, F., Acta Opthalmologica., 1987, 65:44-47; McCormack, G., Am. J. Optom. Physiol. Optics., 1982, 59:60-66.

$$\chi = \frac{\sum pf}{\sum f}$$

Where x is the weighted mean PD for the target group, $\Sigma$ in the numerator is the sum of the products of known PD measures (p) multiplied by their frequencies (f), and $\Sigma$ in the denominator is the sum of the frequencies (f).

By combining weighted means for each target group with the prevalence of the target group in the general population we can calculate the weighted mean PD for each target group in the general population.

$$\chi PD = \frac{\sum \chi f}{\sum f}$$

Where xPD is the weighted mean PD for the target group in the general population, $\Sigma$ in the numerator is the sum of the products of mean calculated above multiplied by their respective frequencies in the general population, and $\Sigma$ in the denominator is the sum of the frequencies in the general population.

Similarly, the standard deviations are found by applying the formula:

$$\sigma = \frac{\sum sdf}{\sum f}$$

Where $\sigma$ is the weighted mean standard deviation for the target population, $\Sigma$ in the numerator is the sum of the products of known standard deviations (sd) multiplied by their frequencies (f), and $\Sigma$ in the denominator is the sum of the frequencies (f).

By combining weighted mean standard for each target group with the prevalence of the target group in the general population we can calculate the weighted mean standard deviation for each target group in the general population.

$$\sigma PD = \frac{\sum \sigma f}{\sum f}$$

Where $\sigma$PD is the weighted mean standard deviation for the target group in the general population, $\Sigma$ in the numerator is the sum of the products of mean standard deviation as calculated above multiplied by their respective frequencies in the general population, and $\Sigma$ in the denominator is the sum of the frequencies in the general population.

Considering the method and steps above, the weighted mean PDs and standard deviations for the current general population of the US is determined as follows.

|  | Male | Female | Unisex |
| --- | --- | --- | --- |
| Asian | 66.80 | 63.02 | 65.01 |
| Black | 69.35 | 65.37 | 65.32 |
| White | 66.19 | 63.12 | 64.40 |
| ALL | 66.57 | 63.40 | 64.54 |
| Std. Dev. | 3.16 | 3.30 | 3.28 |

Now, any of these gender/race groups can be utilized individually or in combination as the target group for determining the OCD of OTC readymade reading glasses. For example, if the Black female population was the consumer group targeted, their mean PD of 65.37 as determined through the method described herein, would dictate using this particular PD in calculating the appropriate OCD setting, differing from say, Black males or Asian females. If the target population includes additional genders and races, then the weighted mean for that population group must be factored in. Now, applying the algorithm for weighted means calculation to the target population of all US persons (race combined) over age 40, reveals a PD of 66.57 mm for men, 63.40 mm for women, and if gender is not considered, a weighted mean PD of 64.54 mm. As provided herein, this method allows for flexibility and recalculation with future changes in population, or selection of different target populations.

The prior art OCD most commonly chosen is about 63 mm, which only agrees with the average 63.4 PD occurring in women in the adult human population. However, this is not in agreement with the mean PDs that have been determined for the male population or the entire population if gender is disregarded (unisex).

Prior art use of 63 mm even creates excessive prism for women. The PD is measured with the eyes positioned in straight-ahead-gaze for objects located far away from the eyes (e.g., at a distance of 6 m or more from the eyes), known as optical infinity where the visual axes between the right and left eyes are parallel. The PD for an object located far away from the eyes is known as the far pupillary distance (FPD). However, when reading, the visual axes converge, and the eyes turn inward narrowing the PD. There is a statistically significant difference between near and far PD. The near PD (NPD) is typically measured with the viewer converging at 40 cm, a typical reading distance, and the far PD with the viewer gazing at infinity. Thus, for the 40 cm reading distance, the average NPD for the general population is actually about 3 mm less than the FPD (3.38 mm less than the far PD for men, 2.93 mm less for women, and 3.17 mm less when gender is not a factor. Consequently, to minimize prism for women, including all races, the OCD for OTC eyeglasses, according to the present invention, is set to be about 60.4 mm, rather than the standard 63.4 mm. Thus, to minimize prism, the OCD for OTC readymade reading eyeglasses, according to a preferred embodiment of the present invention, must be set less than the mean Far PD as calculated above. Applying this formula to the mean Far PDs as calculated above, reveals the mean NPDs by gender for the US population combining race, as 63.19 mm for men (std dev. +/−3.16 mm); 60.47 mm for women (std dev. +/−3.30 mm); and 61.36 mm (std dev. +/−3.28 mm) combined genders. While there remain more calculations and steps to be revealed in the method, the benefit can already be realized by applying only the first steps disclosed. In one embodiment, considering all races in the USA, therefore, the invention provides a pair of eyeglasses with a single OCD that is about 3 mm less than the user's FPD. In a preferred embodiment, considering all races in the USA, the invention provides a pair of eyeglasses with a single OCD of 60.47 mm derived from the calculated mean female user with an FPD of 63.4 mm, and a single OCD of 63.19 mm derived from the calculated mean male user with an FPD of 66.57 mm and for unisex, a single OCD of about 61.36 mm derived from the calculated mean unisex user with an FPD of about 64.54 mm.

As a practical matter, OCD settings are accurate to the nearest 0.5 mm. Therefore, in a preferred embodiment, as derived step by step from the calculations above, the present invention provides OTC readymade reading eyeglasses in multiple OCDs, with a single OCD of 63.0 mm if for males, 60.5 mm if for females and 61.5 mm so as to accommodate a unisex pair of reading glasses for a user of either gender. The gender is particularly relevant to readymade OTC reading glasses, as the style of the readymade reading OTC reading glasses may be fashioned specifically for men, or separately for women or the style may be indiscriminate with regards to gender, that is, unisex.

The near PD adjustment is further dependent upon the distance between the reading material and the eyes, so that if the readymade reading glasses are to be used farther or closer than the 40 cm standard reading distance, additional adjustments to the NPD should be made for further precision. For example, reading glasses used primarily for viewing a computer that is positioned at a typical 76.2 cm from the eye would be optimized to minimize prism if the NPD measures are adjusted for this viewing distance. In this case, the FPD to NPD adjustments of would be 1.80 mm less than FPD for men, resulting in an OCD of 65.0 mm for computer glasses for men, 1.56 mm less than FPD for women resulting in an OCD of 62.0 mm for women's computer glasses, and 1.69 mm less than FPD when gender is not a factor, resulting in a unisex computer glass with OCD setting of 63.0 mm. Similar calculations and resulting OCD findings can be made for any viewing distance.

In another embodiment, the invention provides OTC, ready-made reading eyeglasses in a variety of OCDs to accommodate an even further expanded variety of NPDs, thus further minimizing the untoward aberrations and prism effect and for an ever greater number of people and thereby optimizing the assortment of reading glasses offered as a means to enhancing and prolonging the user's vision and comfort in using the eyeglasses. Furthermore, the eyeglasses are uncovered by any layer such as the film disclosed in U.S. Pat. Nos. 6,910,769 and 4,898,459 that is releasably attached to the lenses of the eyeglasses described therein.

It is envisioned that OTC, ready-made reading eyeglasses in a variety of OCDs to accommodate a variety of PDs will be sold in retail stores such as chain drug stores, convenience stores, food stores and mass market retailers. The user is expected to visit such a store where the OTC, ready-made reading eyeglasses in a variety of OCDs to accommodate a variety of PDs will be contained in an eyeglass display that may be located, for example, as a free-standing kiosk, an in-line fixture, an end-cap fixture, a side wing fixture, a hanging display, a counter top fixture, or the like, within the store. The free-standing kiosk, in-line fixture, end-cap fixture, side wing fixture, hanging display, counter top fixture, or the like, may be static, it may rotate as a whole, or may comprise portions that will rotate individually and other portions that are static. The user who already knows their PD will be able to choose from the display the pair of eyeglasses that most closely matches their PD. The user who does not know their PD, will be able to measure their PD or determine their proper OCD using the methods and devices discussed below.

It is also envisioned that the OTC, ready-made reading eyeglasses in a variety of OCDs to accommodate a variety of PDs, in addition to being sold in retail stores, may concurrently be sold through direct mail, mail order catalogs, over the Internet and/or over the television such as through infomercials or television shopping channels.

II. The Display

Each reading glass offered for sale will be marked for OCD setting or suitable PD range. In the store setting, the glasses can be displayed randomly by any means, and the consumer will use the removably or permanently affixed indicia discussed above to sort for themselves and select the appropriate OCD setting that is the best match for their PD. A more organized systematic method for display is described below.

Figure 7:
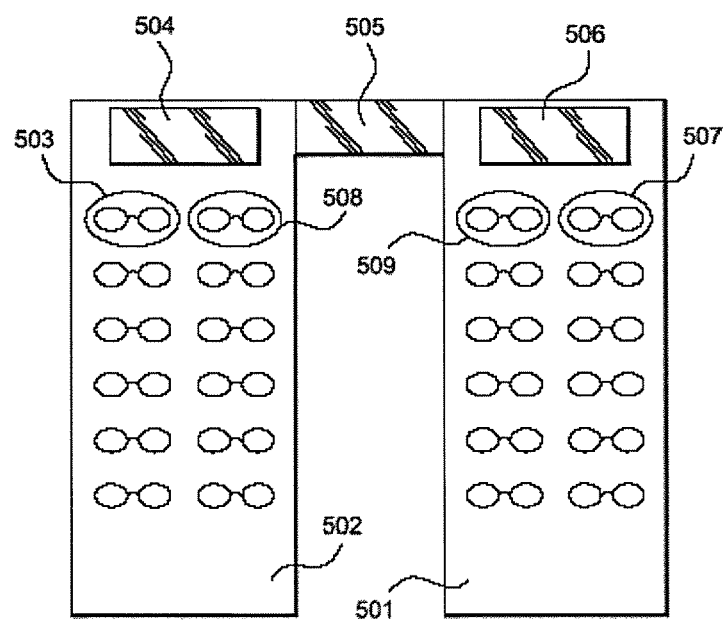
FIG. 7 presents a diagram of an eyeglass display for the display of a plurality of pairs of eyeglasses.

FIG. 7 presents a non-limiting diagram of an eyeglass display for the display of a plurality of pairs of eyeglasses. The display shown in FIG. 7 comprises two panels 501 and 502, comprising two columns of eyeglasses each, and a plurality of holders (not shown) configured to removably retain the plurality of pairs of eyeglasses that have two different OCDs. The eyeglasses 503 and 508, that are retained in the two columns of eyeglasses on panel 501, have a first lens and a second lens wherein the first lens and second lens each have a first optical center and a second optical center, respectively, that are spaced at a first OCD. The eyeglasses 507 and 509, that are retained in the two columns on panel 502, have a third lens and a fourth lens wherein the third lens and fourth lens each have a third optical center and a fourth optical center, respectively, that are spaced at a second OCD, wherein the first OCD is different from the second OCD. Thus, the eyeglasses 503/508 and 507/509 will accommodate users with a wider range of PDs than single OCD selling methods offer by virtue of the fact that they have two different OCDs.

While the eyeglass display shown in FIG. 7 may be used to display eyeglasses with only two OCDs, one might envision using the same display to display eyeglasses with two or more OCDs. Thus, for example, one might envision the display shown in FIG. 7 comprising eyeglasses in the columns comprising eyeglasses 508 and 509 that have OCDs that are different from each other and different from the OCDs of eyeglasses in the columns comprising eyeglasses 503 and 507.

Figure 8:
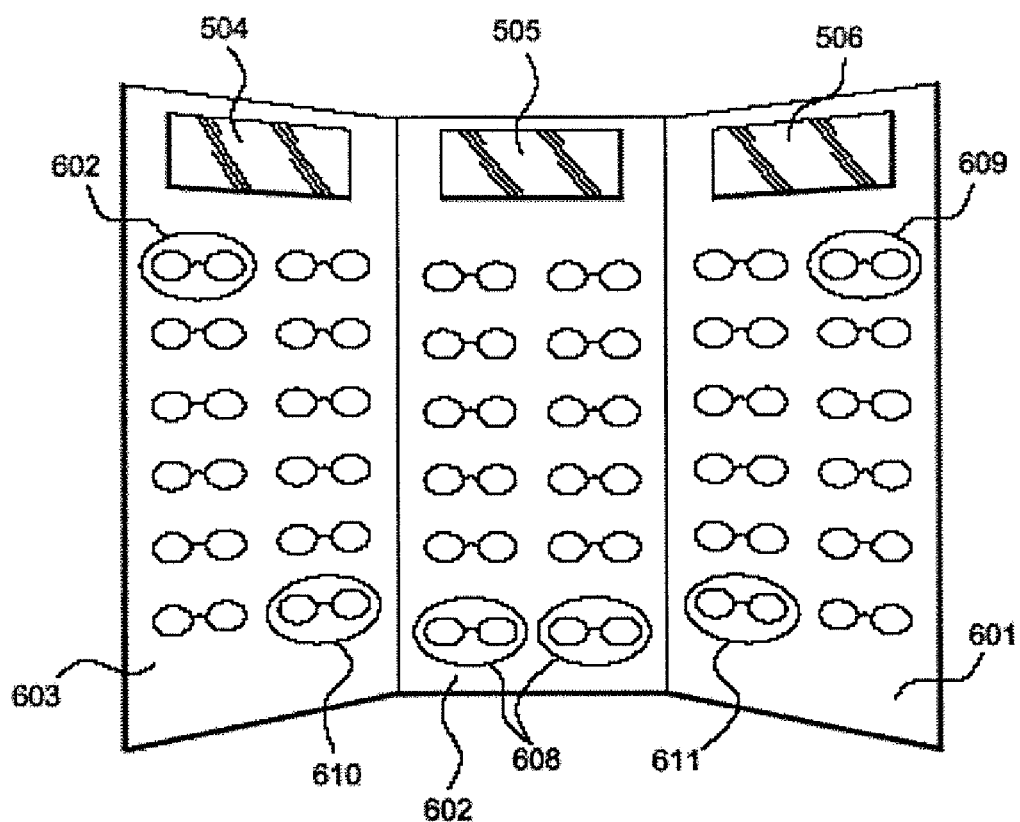
FIG. 8 presents a diagram of another eyeglass display for the display of a plurality of pairs of eyeglasses.

FIG. 8 presents another non-limiting diagram of an eyeglass display for the display of a plurality of pairs of eyeglasses. The eyeglass display shown in FIG. 8 comprises three panels 601, 602 and 603 and a plurality of holders (not shown) configured to removably retain the plurality of pairs of eyeglasses that have three different OCDs. The eyeglasses 607 and 610 that are retained in the two columns on panel 603 have a first lens and a second lens wherein the first lens and second lens each have a first optical center and a second optical center, respectively, that are spaced at a first OCD. The eyeglasses 608 that are retained in the two columns on panel 602 have a third lens and a fourth lens wherein the third lens and fourth lens each have a third optical center and a fourth optical center, respectively, that are spaced at a second OCD. The eyeglasses 609 and 611 that are retained in the two columns on panel on panel 601 have a fifth lens and a sixth lens wherein the fifth lens and sixth lens each have a fifth optical center and a sixth optical center, respectively, that is spaced at a third OCD, wherein the third OCD is different from the first and second OCDs. Thus, the eyeglasses 607, 608, 609, 610 and 611 will accommodate users with a wider range of PDs by virtue of the fact that they have three different OCDs.

While the eyeglass display shown in FIG. 8 may be used to display eyeglasses with only three OCDs, one might envision using the same display to display eyeglasses with three or more OCDs. Thus, for example, one might envision the display shown in FIG. 8 comprising eyeglasses in the columns comprising eyeglasses 610 and 611 that have OCDs that are different from each other and different from the OCDs of eyeglasses in the columns comprising eyeglasses 607, 608 and 609.

The eyeglass display according to one embodiment of the present invention may comprise additional panels on the display comprising a plurality of holders configured to removably retain the plurality of pairs of eyeglasses that have multiple OCDs. The eyeglass display could also comprise a plurality of individual free-standing displays wherein each individual free-standing display comprises a plurality of holders configured to removably retain a plurality of pairs of eyeglasses and wherein the OCD of the eyeglasses retained in a first individual free-standing display is different from the OCD of the eyeglasses in a second individual free-standing display.

In the case where the eyeglass display comprises eyeglasses with four different OCDs, the fourth pair of eyeglasses has a seventh lens and an eighth lens wherein the seventh lens and eight lens each have a seventh optical center and an eighth optical center, respectively, that is spaced at a fourth OCD. The fourth OCD would be different relative to the first, second and third OCDs in the first, second and third pairs of eyeglasses on the display.

The eyeglass displays shown in FIG. 7 and FIG. 8 comprise sub-panels 504 and 506 that may be used for a variety of purposes, including, but not limited to displaying a logo and/or for providing instructions for using the device 505 to determine the user's Near PD or proper OCD, in case they do not know their PD, and for subsequently choosing the proper pair of eyeglasses. The device 505 may be affixed to the display, but need not be. The device for determining the OCD/Near PD for a user may be, for example, a device such as the one described in U.S. Pat. No. 4,944,585, or any of the other patented or commercially available devices specifically designed to measure Near PD A variety of other simple devices, however, can be used to determine the proper OCD for a given Near PD. For example, the device 505 may be a mirror comprising a millimeter or inch ruler adhered (e.g., in the form of a decal), painted, or etched thereon. Alternatively, the device may be a millimeter or inch ruler that is removably affixed to the display. An untrained companion that accompanies the user may assist the user by using the ruler to determine the user's Near PD or the user may be able to determine their Near PD without such assistance by using, for example a mirror—one that may be provided, e.g., in one of the sub-panels 504 or 506.

To determine their OCD for a given Near PD, fore example, the user may stand at a spot marked on the floor, where the spot is at a fixed distance (e.g., 16 inches) from a convex magnifying mirror. The mirror may comprise an inch/millimeter ruler, adhered, painted or etched thereon, that is scaled to accommodate for the distance between the user and the mirror and that further accounts for the distance in reflection and magnification of the mirror. While standing in the spot and looking into the mirror, the user would note where each pupil falls on the scale of the ruler, thus measuring their own Near PD.

Yet another device for determining the user's Near PD may comprise an opaque material (made of, e.g., paper, cardboard and plastic) with openings in the material that are separated by known distances corresponding to the Near PD. The user would then read, for example, type that may be affixed to sub-panel 504 or 506 while looking through the openings. The separation between holes that matches the user's Near PD would provide a single image of the type, whereas wider or narrower hole separation would result in two images or a blurring of the type. Similarly, the user could look at a source of illumination rather than reading the type. The light emanating from the source of illumination would appear as two sources through the openings in the transparent material that are wider or narrower than the Near PD.

Alternatively, type, an object of regard, or a source of illumination may be viewed using a device comprising thin opaque items (made of, e.g., paper, cardboard and plastic), without openings thereon, that are positioned before each pupil in either a series of fixed distances, or in a configuration that allows movement left to right while the user views the type, or object of regard, or source of illumination. When the separation between the opaque items, without openings thereon, covers the pupils, the type or source of illumination will be obscured, and the separation between the opaque items will correspond to the OCD.

Alternatively, the device may be markings on the lenses of each of the eyeglasses, where the markings comprise removable ink, or the like, or other markings to identify the optical centers or the area surrounding the optical centers. The user would don the eyeglasses thus marked, and look in a mirror or view reading material to test or confirm that the optical center markings align with the pupils. The markings on the lenses of each of the eyeglasses themselves could take a variety of configurations, including but not limited to, a circle, an "X", a cross, etc. Similarly, the area of the optical center could remain clear, and removable ink or other markings surround it to obscure vision so that the user would only see through the area of the optical center thus confirming a match for the OCD. These markings could be removed with water or with an alcohol solution (e.g., ethanol and isopropanol) or other chemical agents (e.g., acetone).

In the event that the known NPD for a user (e.g., one previously determined for the user by an optical provider) or the NPD determined using the device does not exactly match the OCD of a pair of eyeglasses on the display, the user would preferably select a pair of eyeglasses from the display that is within the accepted tolerances to keep prism below 0.66Δs (cm/m) per pair. For example, with a +2.75 Diopter lens, to maintain these tolerances the NPD must not differ from the OCD by more than 2.40 mm as shown in Table 1, below.

TABLE 1

| Diopter | Range of variation between OCD and NPD to keep Prism <0.66 |
|---------|-----------------------------------------------------------|
| +1.00   | 6.60 |
| +1.125  | 5.87 |
| +1.25   | 5.28 |
| +1.375  | 4.80 |
| +1.50   | 4.40 |
| +1.625  | 4.06 |
| +1.750  | 3.77 |
| +1.875  | 3.52 |
| +2.00   | 3.30 |
| +2.125  | 3.11 |
| +2.25   | 2.93 |
| +2.375  | 2.78 |
| +2.50   | 2.64 |
| +2.625  | 5.87 |
| +2.75   | 2.40 |
| +2.875  | 2.30 |
| +3.00   | 2.20 |

Alternatively, if the tolerance for maximum prism is adjusted up or down from 0.66Δs, the range of variation between OCD and NPD to meet the selected prism tolerance will necessarily collapse or expand for each Diopter.

III. The Eyeglasses

A. Eyeglasses with a Single OCD

As mentioned above, presently available prior art OTC, ready-made eyeglasses, have an OCD that is pre-set at separations ranging from 54 mm to 64 mm, with many reading glasses and other optical devices typically set at about 63 mm. See Dodgson, N. A., Variation and Extrema of Human Interpupillary Distance, SPIE Vol. 5291:36. But, as determined above, the weighted mean average NPD for the US general population considering all genders and races and rounding to the nearest 0.5 mm is actually about 3 mm less than the respective FPDs. Consequently, to minimize prism utilizing only a single OCD per gender, the preferred OCD for OTC ready-made reading eyeglasses for 40 cm viewing distance, according to a preferred embodiment of the present invention, is set to be 63.0 mm for males, 60.5 mm for females (about 60.4 mm) and 61.5 mm when gender is not specified.

The percentage of the population that is exposed to excessive prism above a certain threshold (as defined above) can be determined by arriving at the standardized value for each NPD setting:

$$Z = \frac{NPD - \mu}{\sigma}$$

Where Z is the standardized NPD value derived by taking the quotient of the difference between the chosen NPD and $\mu$ mean, divided by $\sigma$, the standard deviation.

Next, the standard normal cumulative distribution function is determined:

$$f(Z) = \frac{e^{-Z^2/2}}{\sqrt{2\pi}}$$

Where f(Z) is the standard normal density for the given NPD setting derived by taking the quotient of e (2.718) to the power of the quotient of the particular standardized setting squared, divided by two, all divided by the square root of $2\pi$.

The prism threshold is then compared to the calculated prism for each OCD/NPD combination for each Diopter power. If the threshold is met, the corresponding percent of the population f(NPD) can be considered to be able to wear the glasses with that particular OCD setting, without eyestrain. However, if the chosen prism threshold for any NPD is exceeded, then the corresponding percent of the population with that same NPD can be considered to be unsuitable for ready-made reading glasses with that particular OCD setting. For example, if the prism created by a particular OCD/NPD combination exceeds the threshold limit, then the percentage of the target population experiencing below threshold prism would be zero %. However, if the prism created by the chosen OCD/NPD combination is less than the threshold, then the amount of the population that would benefit from optimized reading, would be equivalent to the percentile f(NPD) within the target population for that particular NPD for that Diopter power. The percentages of the target population that fall within or under the threshold limit for each Diopter/NPD/OCD setting are then summed. The OCD capable of minimizing prism for the highest percentage of the population is thus identified.

Table 2, below, shows the prism values determined for the female population in the US (NPD average=60.4 mm) according to formula (I), where the OCD is 63.4 mm and corresponds to one of the most common commercially available OCD settings.

Prism=(OCD−NPD)×0.1×diopter  (I)

The stepped line in Table 2 denotes the percentage of the population of female users that falls under each NPD measurement, with a majority of users having an NPD of about 60 mm. An OCD of 63.4 mm creates unwanted prism in excess of the recommended 0.66Δs errors (shaded areas) for a significant proportion of normal NPD/Diopter combinations. The excessive prism shown in the shaded areas does not coincide with NPD values outside the stepped line. Hence, the OCD of 63.4 mm creates an unacceptable level of prism for a large segment of the population of users.

The prior art has failed to systematically study and analyze which interpupillary distance(s) best represent the end users of binocular devices or eyewear. For example, U.S. Pat. No. 4,591,246 discloses the use of an OCD setting of 60 mm; U.S. Pat. Nos. 4,898,459 and 5,537,249 disclose the use of 62 mm; U.S. Pat. No. 5,897,184 discloses the use of 63 mm; U.S. Pat. No. 7,224,382 discloses the use of 63.5 mm; U.S. Pat. Nos. 5,084,781, 5,682,220, 6,511,181, 7,066,597, and 7,242,522 each disclose the use of 64 mm; and U.S. Pat. Nos. 4,033,678, 6,258,494, and 7,046,271 each disclose the use of 65 mm. However, using the methods described above, it may be observed that the calculated OCD setting for females of all races in the US population viewing at 40 cm is actually 60.5 mm (rounded). Continuing with the methods described above, reading glasses with OCD setting of 60.5 mm as discovered here and as shown in Table 4, for Diopter powers

TABLE 2

PRISM VALUES ACROSS RANGE OF NPDs AND DIOPTERS FOR SINGLE OCD 63.4

% of Population each PD shown as stepped line

| OCD 63.4 | NPD 50.0 | 51.0 | 52.0 | 53.0 | 54.0 | 55.0 | 56.0 | 57.0 | 58.0 | 59.0 | 60.0 | 61.0 | 62.0 | 63.0 | 64.0 | 65.0 | 66.0 | 67.0 | 68.0 | 69.0 | 70.0 | % |
|---|---|---|---|---|---|---|---|---|---|---|---|---|---|---|---|---|---|---|---|---|---|---|
| ▼+3.000 | 4.02 | 3.72 | 3.42 | 3.12 | 2.82 | 2.52 | 2.22 | 1.92 | 1.62 | 1.32 | 1.02 | 0.72 | 0.42 | 0.12 | 0.18 | 0.48 | 0.78 | 1.08 | 1.38 | 1.68 | 1.98 | 11.00% |
| ▼+2.875 | 3.85 | 3.57 | 3.28 | 2.99 | 2.70 | 2.42 | 2.13 | 1.84 | 1.55 | 1.27 | 0.98 | 0.69 | 0.40 | 0.12 | 0.17 | 0.46 | 0.75 | 1.04 | 1.32 | 1.61 | 1.90 | 10.38% |
| ▼+2.750 | 3.69 | 3.41 | 3.14 | 2.86 | 2.59 | 2.31 | 2.04 | 1.76 | 1.49 | 1.21 | 0.94 | 0.66 | 0.39 | 0.11 | 0.17 | 0.44 | 0.72 | 0.99 | 1.27 | 1.54 | 1.82 | 9.75% |
| ▼+2.625 | 3.52 | 3.26 | 2.99 | 2.73 | 2.47 | 2.21 | 1.94 | 1.68 | 1.42 | 1.16 | 0.89 | 0.63 | 0.37 | 0.11 | 0.16 | 0.42 | 0.68 | 0.95 | 1.21 | 1.47 | 1.73 | 9.13% |
| ▼+2.500 | 3.35 | 3.10 | 2.85 | 2.60 | 2.35 | 2.10 | 1.85 | 1.60 | 1.35 | 1.10 | 0.85 | 0.60 | 0.35 | 0.10 | 0.15 | 0.40 | 0.65 | 0.90 | 1.15 | 1.40 | 1.65 | 8.50% |
| ▼+2.375 | 3.18 | 2.95 | 2.71 | 2.47 | 2.23 | 2.00 | 1.76 | 1.52 | 1.28 | 1.05 | 0.81 | 0.57 | 0.33 | 0.09 | 0.14 | 0.38 | 0.62 | 0.86 | 1.09 | 1.33 | 1.57 | 7.88% |
| ▼+2.250 | 3.02 | 2.79 | 2.57 | 2.34 | 2.12 | 1.89 | 1.67 | 1.44 | 1.22 | 0.99 | 0.77 | 0.54 | 0.32 | 0.09 | 0.14 | 0.36 | 0.59 | 0.81 | 1.04 | 1.26 | 1.49 | 7.25% |
| ▼+2.125 | 2.85 | 2.64 | 2.42 | 2.21 | 2.00 | 1.79 | 1.57 | 1.36 | 1.15 | 0.94 | 0.72 | 0.51 | 0.30 | 0.08 | 0.13 | 0.34 | 0.55 | 0.77 | 0.98 | 1.19 | 1.40 | 6.63% |
| ▼+2.000 | 2.68 | 2.48 | 2.28 | 2.08 | 1.88 | 1.68 | 1.48 | 1.28 | 1.08 | 0.88 | 0.68 | 0.48 | 0.28 | 0.08 | 0.12 | 0.32 | 0.52 | 0.72 | 0.92 | 1.12 | 1.32 | 6.00% |
| ▼+1.875 | 2.51 | 2.33 | 2.14 | 1.95 | 1.76 | 1.58 | 1.39 | 1.20 | 1.01 | 0.83 | 0.64 | 0.45 | 0.26 | 0.07 | 0.11 | 0.30 | 0.49 | 0.68 | 0.86 | 1.05 | 1.24 | 5.38% |
| ▼+1.750 | 2.35 | 2.17 | 2.00 | 1.82 | 1.65 | 1.47 | 1.30 | 1.12 | 0.95 | 0.77 | 0.60 | 0.42 | 0.25 | 0.07 | 0.11 | 0.28 | 0.46 | 0.63 | 0.81 | 0.98 | 1.16 | 4.75% |
| ▼+1.625 | 2.18 | 2.02 | 1.85 | 1.69 | 1.53 | 1.37 | 1.20 | 1.04 | 0.88 | 0.72 | 0.55 | 0.39 | 0.23 | 0.06 | 0.10 | 0.26 | 0.42 | 0.59 | 0.75 | 0.91 | 1.07 | 4.13% |
| ▼+1.500 | 2.01 | 1.86 | 1.71 | 1.56 | 1.41 | 1.26 | 1.11 | 0.96 | 0.81 | 0.66 | 0.51 | 0.36 | 0.21 | 0.06 | 0.09 | 0.24 | 0.39 | 0.54 | 0.69 | 0.84 | 0.99 | 3.50% |
| ▼+1.275 | 1.71 | 1.58 | 1.45 | 1.33 | 1.20 | 1.07 | 0.94 | 0.82 | 0.69 | 0.56 | 0.43 | 0.31 | 0.18 | 0.05 | 0.08 | 0.20 | 0.33 | 0.46 | 0.59 | 0.71 | 0.84 | 2.88% |
| ▼+1.250 | 1.68 | 1.55 | 1.43 | 1.30 | 1.18 | 1.05 | 0.93 | 0.80 | 0.68 | 0.55 | 0.43 | 0.30 | 0.18 | 0.05 | 0.08 | 0.20 | 0.33 | 0.45 | 0.58 | 0.70 | 0.83 | 2.25% |
| ▼+1.125 | 1.51 | 1.40 | 1.28 | 1.17 | 1.06 | 0.95 | 0.83 | 0.72 | 0.61 | 0.50 | 0.38 | 0.27 | 0.16 | 0.04 | 0.07 | 0.18 | 0.29 | 0.41 | 0.52 | 0.63 | 0.74 | 1.63% |
| ▼+1.000 | 1.34 | 1.24 | 1.14 | 1.04 | 0.94 | 0.84 | 0.74 | 0.64 | 0.54 | 0.44 | 0.34 | 0.24 | 0.14 | 0.04 | 0.06 | 0.16 | 0.26 | 0.36 | 0.46 | 0.56 | 0.66 | 1.00% |

However, an OCD of 60.4 mm, in contrast to an OCD of 63.4 mm, minimizes the prism and aberrations encountered by a majority of female eyeglass users. As shown below, in Table 3, by selecting 60.4 mm as the OCD, nearly all NPDs in the normal population (area under stepped line) will encounter minimum prism and aberrations (unshaded area). In Table 3, the shaded areas denoting excessive prism, fall outside the normal NPD distribution for most NPD/Diopter combinations.

TABLE 3

PRISM VALUES ACROSS RANGE OF NPDs AND DIOPTERS FOR SINGLE OCD 60.4

% of Population each PD shown as stepped line

| OCD 60.4 | NPD 50.0 | 51.0 | 52.0 | 53.0 | 54.0 | 55.0 | 56.0 | 57.0 | 58.0 | 59.0 | 60.0 | 61.0 | 62.0 | 63.0 | 64.0 | 65.0 | 66.0 | 67.0 | 68.0 | 69.0 | 70.0 | % |
|---|---|---|---|---|---|---|---|---|---|---|---|---|---|---|---|---|---|---|---|---|---|---|
| ▼+3.000 | 3.12 | 2.82 | 2.52 | 2.22 | 1.92 | 1.62 | 1.32 | 1.02 | 0.72 | 0.42 | 0.12 | 0.18 | 0.48 | 0.78 | 1.08 | 1.38 | 1.68 | 1.98 | 2.28 | 2.58 | 2.88 | 11.00% |
| ▼+2.875 | 2.99 | 2.70 | 2.42 | 2.13 | 1.84 | 1.55 | 1.27 | 0.98 | 0.69 | 0.40 | 0.12 | 0.17 | 0.46 | 0.75 | 1.04 | 1.32 | 1.61 | 1.90 | 2.19 | 2.47 | 2.76 | 10.38% |
| ▼+2.750 | 2.86 | 2.59 | 2.31 | 2.04 | 1.76 | 1.49 | 1.21 | 0.94 | 0.66 | 0.39 | 0.11 | 0.17 | 0.44 | 0.72 | 0.99 | 1.27 | 1.54 | 1.82 | 2.09 | 2.37 | 2.64 | 9.75% |
| ▼+2.625 | 2.73 | 2.47 | 2.21 | 1.94 | 1.68 | 1.42 | 1.16 | 0.89 | 0.63 | 0.37 | 0.11 | 0.16 | 0.42 | 0.68 | 0.95 | 1.21 | 1.47 | 1.73 | 2.00 | 2.26 | 2.52 | 9.13% |
| ▼+2.500 | 2.60 | 2.35 | 2.10 | 1.85 | 1.60 | 1.35 | 1.10 | 0.85 | 0.60 | 0.35 | 0.10 | 0.15 | 0.40 | 0.65 | 0.90 | 1.15 | 1.40 | 1.65 | 1.90 | 2.15 | 2.40 | 8.50% |
| ▼+2.375 | 2.47 | 2.23 | 2.00 | 1.76 | 1.52 | 1.28 | 1.05 | 0.81 | 0.57 | 0.33 | 0.09 | 0.14 | 0.38 | 0.62 | 0.86 | 1.09 | 1.33 | 1.57 | 1.81 | 2.04 | 2.28 | 7.88% |
| ▼+2.250 | 2.34 | 2.12 | 1.89 | 1.67 | 1.44 | 1.22 | 0.99 | 0.77 | 0.54 | 0.32 | 0.09 | 0.14 | 0.36 | 0.59 | 0.81 | 1.04 | 1.26 | 1.49 | 1.71 | 1.94 | 2.16 | 7.25% |
| ▼+2.125 | 2.21 | 2.00 | 1.79 | 1.57 | 1.36 | 1.15 | 0.94 | 0.72 | 0.51 | 0.30 | 0.08 | 0.13 | 0.34 | 0.55 | 0.77 | 0.98 | 1.19 | 1.40 | 1.62 | 1.83 | 2.04 | 6.63% |
| ▼+2.000 | 2.08 | 1.88 | 1.68 | 1.48 | 1.28 | 1.08 | 0.88 | 0.68 | 0.48 | 0.28 | 0.08 | 0.12 | 0.32 | 0.52 | 0.72 | 0.92 | 1.12 | 1.32 | 1.52 | 1.72 | 1.92 | 6.00% |
| ▼+1.875 | 1.95 | 1.76 | 1.58 | 1.39 | 1.20 | 1.01 | 0.83 | 0.64 | 0.45 | 0.26 | 0.07 | 0.11 | 0.30 | 0.49 | 0.68 | 0.86 | 1.05 | 1.24 | 1.43 | 1.61 | 1.80 | 5.38% |
| ▼+1.750 | 1.82 | 1.65 | 1.47 | 1.30 | 1.12 | 0.95 | 0.77 | 0.60 | 0.42 | 0.25 | 0.07 | 0.11 | 0.28 | 0.46 | 0.63 | 0.81 | 0.98 | 1.16 | 1.33 | 1.51 | 1.68 | 4.75% |
| ▼+1.625 | 1.69 | 1.53 | 1.37 | 1.20 | 1.04 | 0.88 | 0.72 | 0.55 | 0.39 | 0.23 | 0.06 | 0.10 | 0.26 | 0.42 | 0.59 | 0.75 | 0.91 | 1.07 | 1.24 | 1.40 | 1.56 | 4.13% |
| ▼+1.500 | 1.56 | 1.41 | 1.26 | 1.11 | 0.96 | 0.81 | 0.66 | 0.51 | 0.36 | 0.21 | 0.06 | 0.09 | 0.24 | 0.39 | 0.54 | 0.69 | 0.84 | 0.99 | 1.14 | 1.29 | 1.44 | 3.50% |
| ▼+1.275 | 1.33 | 1.20 | 1.07 | 0.94 | 0.82 | 0.69 | 0.56 | 0.43 | 0.31 | 0.18 | 0.05 | 0.08 | 0.20 | 0.33 | 0.46 | 0.59 | 0.71 | 0.84 | 0.97 | 1.10 | 1.22 | 2.88% |
| ▼+1.250 | 1.30 | 1.18 | 1.05 | 0.93 | 0.80 | 0.68 | 0.55 | 0.43 | 0.30 | 0.18 | 0.05 | 0.08 | 0.20 | 0.33 | 0.45 | 0.58 | 0.70 | 0.83 | 0.95 | 1.08 | 1.20 | 2.25% |
| ▼+1.125 | 1.17 | 1.06 | 0.95 | 0.83 | 0.72 | 0.61 | 0.50 | 0.38 | 0.27 | 0.16 | 0.04 | 0.07 | 0.18 | 0.29 | 0.41 | 0.52 | 0.63 | 0.74 | 0.86 | 0.97 | 1.08 | 1.63% |
| ▼+1.000 | 1.04 | 0.94 | 0.84 | 0.74 | 0.64 | 0.54 | 0.44 | 0.34 | 0.24 | 0.14 | 0.04 | 0.06 | 0.16 | 0.26 | 0.36 | 0.46 | 0.56 | 0.66 | 0.76 | 0.86 | 0.96 | 1.00% | between +2.75 and +1.25 will generate 0.32Δ prism on average for US females of all races within one standard deviation of the mean (68% of the population, with NPDs between 57.5 mm and 63.5 mm), and on average, the majority of the population within one standard deviation will experience an acceptable level of prism (below threshold).

exceeding the tolerable limits for the US population within two standard deviations of the mean. The excessive prism encountered results in undue eyestrain, and reduced performance with the prior art reading glasses. Following the new method provided herein, the new OCD settings, previously not disclosed, are arrived at with the surprising and remark-

TABLE 4

| Population f % | | 3.7% | 4.3% | 4.8% | 5.2% | 5.6% | 5.9% | 6.6% | 6.0% | 5.9% | 5.6% | 5.2% | 4.8% | 4.3% | | |
|---|---|---|---|---|---|---|---|---|---|---|---|---|---|---|---|---|
| Std. Dev. Z Score | | (0.9) | (0.8) | (0.6) | (0.5) | (0.3) | (0.2) | - | 0.2 | 0.3 | 0.5 | 0.6 | 0.8 | 0.9 | ave | % < |
| Diopter | NPD | 57.5 | 58.0 | 58.5 | 59.0 | 59.5 | 60.0 | 60.5 | 61.0 | 61.5 | 62.0 | 62.5 | 63.0 | 63.5 | prism | 0.66 Δ |
| | OCD | | | | | Prism (shaded cells > 0.66Δ) | | | | | | | | | | |
| 2.750 | 60.50 | 0.83 | 0.69 | 0.55 | 0.41 | 0.28 | 0.14 | 0.00 | 0.14 | 0.28 | 0.41 | 0.55 | 0.69 | 0.83 | 0.44 | 50.9% |
| 2.625 | 60.50 | 0.79 | 0.66 | 0.53 | 0.39 | 0.26 | 0.13 | 0.00 | 0.13 | 0.26 | 0.39 | 0.53 | 0.66 | 0.79 | 0.42 | 59.9% |
| 2.500 | 60.50 | 0.75 | 0.63 | 0.50 | 0.38 | 0.25 | 0.13 | 0.00 | 0.13 | 0.25 | 0.38 | 0.50 | 0.63 | 0.75 | 0.40 | 59.9% |
| 2.375 | 60.50 | 0.71 | 0.59 | 0.48 | 0.36 | 0.24 | 0.12 | 0.00 | 0.12 | 0.24 | 0.36 | 0.48 | 0.59 | 0.71 | 0.38 | 59.9% |
| 2.250 | 60.50 | 0.68 | 0.56 | 0.45 | 0.34 | 0.23 | 0.11 | 0.00 | 0.11 | 0.23 | 0.34 | 0.45 | 0.56 | 0.68 | 0.36 | 59.9% |
| 2.125 | 60.50 | 0.64 | 0.53 | 0.43 | 0.32 | 0.21 | 0.11 | 0.00 | 0.11 | 0.21 | 0.32 | 0.43 | 0.53 | 0.64 | 0.34 | 67.9% |
| 2.000 | 60.50 | 0.60 | 0.50 | 0.40 | 0.30 | 0.20 | 0.10 | 0.00 | 0.10 | 0.20 | 0.30 | 0.40 | 0.50 | 0.60 | 0.32 | 67.9% |
| 1.875 | 60.50 | 0.56 | 0.47 | 0.38 | 0.28 | 0.19 | 0.09 | 0.00 | 0.09 | 0.19 | 0.28 | 0.38 | 0.47 | 0.56 | 0.30 | 67.9% |
| 1.750 | 60.50 | 0.53 | 0.44 | 0.35 | 0.26 | 0.18 | 0.09 | 0.00 | 0.09 | 0.18 | 0.26 | 0.35 | 0.44 | 0.53 | 0.28 | 67.9% |
| 1.625 | 60.50 | 0.49 | 0.41 | 0.33 | 0.24 | 0.16 | 0.08 | 0.00 | 0.08 | 0.16 | 0.24 | 0.33 | 0.41 | 0.49 | 0.26 | 67.9% |
| 1.500 | 60.50 | 0.45 | 0.38 | 0.30 | 0.23 | 0.15 | 0.08 | 0.00 | 0.08 | 0.15 | 0.23 | 0.30 | 0.38 | 0.45 | 0.24 | 67.9% |
| 1.375 | 60.50 | 0.41 | 0.34 | 0.28 | 0.21 | 0.14 | 0.07 | 0.00 | 0.07 | 0.14 | 0.21 | 0.28 | 0.34 | 0.41 | 0.22 | 67.9% |
| 1.250 | 60.50 | 0.38 | 0.31 | 0.25 | 0.19 | 0.13 | 0.06 | 0.00 | 0.06 | 0.13 | 0.19 | 0.25 | 0.31 | 0.38 | 0.20 | 67.9% |
| | AVE Δ | 0.60 | 0.50 | 0.40 | 0.30 | 0.20 | 0.10 | 0.00 | 0.10 | 0.20 | 0.30 | 0.40 | 0.50 | 0.60 | 0.32 | 64.1% |

However, as shown in Table 5 below, the prior art suggestion of 64 mm for OCD setting creates 119% more prism on average (0.70Δ) than the 60.5 mm OCD setting discovered here, and would create a diminished proportion of the female population (35.2% vs. 64.1%) that would benefit from acceptable levels of prism.

able benefit of minimizing prism beyond prior art, and thereby lessening eyestrain. The methods as provided herein may be used to calculate the best OCD to minimize prism for any viewing distance, any diopter power, any gender or race that a reading glass is targeted to serve.

TABLE 5

| Population f % | | 4% | 4% | 5% | 5% | 6% | 6% | 7% | 6% | 6% | 6% | 5% | 5% | 4% | | |
|---|---|---|---|---|---|---|---|---|---|---|---|---|---|---|---|---|
| Std. Dev. Z Score | | (0.9) | (0.8) | (0.6) | (0.5) | (0.3) | (0.2) | - | 0.2 | 0.3 | 0.5 | 0.6 | 0.8 | 0.9 | ave | % < |
| Diopter | NPD | 57.5 | 58.0 | 58.5 | 59.0 | 59.5 | 60.0 | 60.5 | 61.0 | 61.5 | 62.0 | 62.5 | 63.0 | 63.5 | prism | 0.66 Δ |
| | OCD | | | | | | | | | | | | | | | |
| 2.750 | 64.00 | 1.79 | 1.65 | 1.51 | 1.38 | 1.24 | 1.10 | 0.96 | 0.83 | 0.69 | 0.55 | 0.41 | 0.28 | 0.14 | 0.96 | 19.9% |
| 2.625 | 64.00 | 1.71 | 1.58 | 1.44 | 1.31 | 1.18 | 1.05 | 0.92 | 0.79 | 0.66 | 0.53 | 0.39 | 0.26 | 0.13 | 0.92 | 25.8% |
| 2.500 | 64.00 | 1.63 | 1.50 | 1.38 | 1.25 | 1.13 | 1.00 | 0.88 | 0.75 | 0.63 | 0.50 | 0.38 | 0.25 | 0.13 | 0.88 | 25.8% |
| 2.375 | 64.00 | 1.54 | 1.43 | 1.31 | 1.19 | 1.07 | 0.95 | 0.83 | 0.71 | 0.59 | 0.48 | 0.36 | 0.24 | 0.12 | 0.83 | 25.8% |
| 2.250 | 64.00 | 1.46 | 1.35 | 1.24 | 1.13 | 1.01 | 0.90 | 0.79 | 0.68 | 0.56 | 0.45 | 0.34 | 0.23 | 0.11 | 0.79 | 25.8% |
| 2.125 | 64.00 | 1.38 | 1.28 | 1.17 | 1.06 | 0.96 | 0.85 | 0.74 | 0.64 | 0.53 | 0.43 | 0.32 | 0.21 | 0.11 | 0.74 | 31.8% |
| 2.000 | 64.00 | 1.30 | 1.20 | 1.10 | 1.00 | 0.90 | 0.80 | 0.70 | 0.60 | 0.50 | 0.40 | 0.30 | 0.20 | 0.10 | 0.70 | 31.8% |
| 1.875 | 64.00 | 1.22 | 1.13 | 1.03 | 0.94 | 0.84 | 0.75 | 0.66 | 0.56 | 0.47 | 0.38 | 0.28 | 0.19 | 0.09 | 0.66 | 38.4% |
| 1.750 | 64.00 | 1.14 | 1.05 | 0.96 | 0.88 | 0.79 | 0.70 | 0.61 | 0.53 | 0.44 | 0.35 | 0.26 | 0.18 | 0.09 | 0.61 | 38.4% |
| 1.625 | 64.00 | 1.06 | 0.98 | 0.89 | 0.81 | 0.73 | 0.65 | 0.57 | 0.49 | 0.41 | 0.33 | 0.24 | 0.16 | 0.08 | 0.57 | 44.3% |
| 1.500 | 64.00 | 0.98 | 0.90 | 0.83 | 0.75 | 0.68 | 0.60 | 0.53 | 0.45 | 0.38 | 0.30 | 0.23 | 0.15 | 0.08 | 0.53 | 44.3% |
| 1.375 | 64.00 | 0.89 | 0.83 | 0.76 | 0.69 | 0.62 | 0.55 | 0.48 | 0.41 | 0.34 | 0.28 | 0.21 | 0.14 | 0.07 | 0.48 | 49.9% |
| 1.250 | 64.00 | 0.81 | 0.75 | 0.69 | 0.63 | 0.56 | 0.50 | 0.44 | 0.38 | 0.31 | 0.25 | 0.19 | 0.13 | 0.06 | 0.44 | 55.1% |
| | AVE Δ | 1.30 | 1.20 | 1.10 | 1.00 | 0.90 | 0.80 | 0.70 | 0.60 | 0.50 | 0.40 | 0.30 | 0.20 | 0.10 | 0.70 | 35.2% |

Considering the female population within 2 standard deviations of the mean, or 95% of the population, said prior art OCD setting of 64 mm would, on average, result in excessive prism (on average 0.86Δ), with 50% of the population seeing through prism beyond the ISO threshold for women. Thus, it is seen that prior art OCD settings created excessive prism and result in diminished performance, whereas the innovation presented here results in minimum prism and a boost in reading glass performance.

Using a combined average of prior art OCD settings, 40% of the population would experience excessive prism and distortion with prior art reading glasses, averaging, 0.79Δ, The census data for gender and race for the target population in a given locale can vary, and can be used to create a specific OCD setting for a targeted location, thereby resulting in the novel method of providing a different OCD setting for optimized reading glass performance for that particular subpopulation. For example, due to specific mix of races, the population of Boise, Id. would be best served with a unisex OCD setting of 61.0 mm versus Jackson, Miss. calling for a unisex setting of 62.5 mm, which means a significant swing in prism of 0.30Δ on average (nearly 50% of the threshold) across all Diopters from +2.75 to +1.25. This is not to suggest that any or all OTC reading glass suppliers, vendors or retailers must customize their reading glass offerings by micromarket, but illustrates the new finding: that inclusion of specific NPD weighted by gender and race prevalence improves the troublesome prismatic error in reading glasses. Even if the broad general US population is simply used for prevalence data in this new method of calculation of OCD settings, this will result in extraordinary improvement over the prior art in minimizing prism for OTC reading glasses and thereby offer the benefit of better reading glass performance to users.

Similarly, the US population mix of race is projected to change. The methods presented here incorporate the population projections and forecast future NPD means to increase by 0.5 mm for men by year 2017, for women by year 2026, and for combined genders by year 2027. In a preferred embodiment, the OCDs derived from the methods disclosed here enable larger percentages of the population to read through glasses with less prism than was previously possible. The percentage of people that will experience less than or equal to 0.66Δ for each gender and Diopter with the newly taught OCDs are shown in Table 6.

TABLE 6

|  | % Population < or = 0.66 Δ | | | |
|---|---|---|---|---|
| Reading Glasses OCD | Unisex 61.5 | Male 63 | Female 60.5 | Overall |
| +3.000 | 50.6% | 52.2% | 50.9% | |
| +2.875 | 50.6% | 52.2% | 50.9% | |
| +2.750 | 50.6% | 52.2% | 50.9% | |
| +2.625 | 59.7% | 61.4% | 59.9% | |
| +2.500 | 59.7% | 61.4% | 59.9% | |
| +2.375 | 59.7% | 61.4% | 59.9% | |
| +2.250 | 59.7% | 61.4% | 59.9% | |
| +2.125 | 67.7% | 69.4% | 67.9% | |
| +2.000 | 67.7% | 69.4% | 67.9% | |
| +1.875 | 74.6% | 76.3% | 74.8% | |
| +1.750 | 74.6% | 76.3% | 74.8% | |
| +1.625 | 80.4% | 81.9% | 80.6% | |
| +1.500 | 80.4% | 81.9% | 80.6% | |
| +1.375 | 85.1% | 86.5% | 85.4% | |
| +1.250 | 89.0% | 90.2% | 89.3% | |
| +1.125 | 92.0% | 93.0% | 92.3% | |
| +1.000 | 96.0% | 96.7% | 96.4% | |
| +0.875 | 98.2% | 98.5% | 98.6% | |
| +0.750 | 99.2% | 99.4% | 99.7% | |
| +0.625 | 99.8% | 99.8% | 100.4% | |
| +0.500 | 99.8% | 99.8% | 100.4% | |
| +0.375 | 99.8% | 99.8% | 100.4% | |
| +0.250 | 99.8% | 99.8% | 100.4% | |
| ave +3.00 to +1.25 | 67.3% | 68.9% | 67.6% | 68% |
| ave +3.00 to +0.25 | 78.0% | 79.2% | 78.3% | 79% |

Eyeglasses with Multiple OCDs Per Gender

Additional OCD settings provides more precise readymade reading glasses. Until now, there was no method to determine what factory settings to utilize, nor how many to offer. When the cost, inventory and space allow for multiple OCD settings per gender, herein is also provided a method for determining the precise optimized OCD settings for the target population, as well as a method for determining how many OCD settings to offer. As with single settings per gender, the method provides that multiple settings per gender are determined by first calculating the amount of prism that will occur for each and every possible NPD in the target population against each and every possible series of OCD settings for each and every Diopter power offered in the readymade reading glasses. With multiple OCD settings, this iterative and tedious process requires over 12,000 individual calculations for each gender (where race is combined) utilizing the prism formula. The amount of prism occurring for each of the Diopter/NPD/OCD combination is then compared, to the desired level of prism that will optimize vision. As previously noted, ISO guidelines call for horizontal tolerances of 0.66Δ, or less to ensure comfortable vision.

Intuition dictates that the preferred OCD settings are those that provide the least prism on average. However, further exploration reveals an unobvious flaw in this logic. The steps outlined below overcome this deception and reveal the unapparent method for arriving at the best OCD settings that offer surprising and unanticipated benefits for reading glass users.

Just as the veracity of the single OCD settings above can be verified by utilizing the standard normal density calculation, this formula can be utilized to determine the fewest multiple OCD settings that will benefit the most people. The multiple OCD settings that minimize prism for the highest percentage of the population are significantly found to be very different than the OCD settings simply based upon those which produce the minimum average prism. For example, the two best OCD settings that minimize prism for unisex eyeglasses for the US population (within two standard deviations of the mean) are 58 mm and 65 mm for diopters +2.75 to +1.75 expanding to 57.5 mm and 65.5 mm for lower Diopter of +1.625 to +1.50 and 57 mm combined with 66 mm for +1.375 Diopter and 56.5 mm combined with 66.5 mm for +1.25 Diopter (Table 7). On average, these settings will generate 0.34Δ across 95% of the population. However, these OCD settings would create excessive prism around the median, high frequency area of the population (SHADED AREAS), resulting in only 62.3% of the population seeing below threshold prism values for a +2.75 Diopter power reading glass. In other words, more than 37% of the population requiring a +2.75 lens would experience excessive prism with these OCD settings even though fundamentally the average prism is only 0.34Δ.

TABLE 7

| Population f % | 1.0% | 1.3% | 1.7% | 2.1% | 2.6% | 3.2% | 3.7% | 4.3% | 4.8% | 5.3% | 5.7% | 5.9% | 6.1% | 6.1% | 5.9% | 5.7% |
|---|---|---|---|---|---|---|---|---|---|---|---|---|---|---|---|---|
| Std. Dev. Z Score | (2.0) | (1.8) | (1.7) | (1.5) | (1.4) | (1.2) | (1.1) | (0.9) | (0.8) | (0.6) | (0.5) | (0.3) | (0.2) | - | 0.2 | 0.3 |
| NPD | 55.0 | 55.5 | 56.0 | 56.5 | 57.0 | 57.5 | 58.0 | 58.5 | 59.0 | 59.5 | 60.0 | 60.5 | 61.0 | 61.5 | 62.0 | 62.5 |
| Diopter OCD | | | | | | | | | | | | | | | | |
| +2.750  58 & 65 | 0.83 | 0.69 | 0.55 | 0.41 | 0.28 | 0.14 | 0.00 | 0.14 | 0.28 | 0.41 | 0.55 | 0.69 | 0.83 | 0.96 | 0.83 | 0.69 |
| +2.625  58 & 65 | 0.79 | 0.66 | 0.53 | 0.39 | 0.26 | 0.13 | 0.00 | 0.13 | 0.26 | 0.39 | 0.53 | 0.66 | 0.79 | 0.92 | 0.79 | 0.66 |
| +2.500  58 & 65 | 0.75 | 0.63 | 0.50 | 0.38 | 0.25 | 0.13 | 0.00 | 0.13 | 0.25 | 0.38 | 0.50 | 0.63 | 0.75 | 0.88 | 0.75 | 0.63 |
| +2.375  58 & 65 | 0.71 | 0.59 | 0.48 | 0.36 | 0.24 | 0.12 | 0.00 | 0.12 | 0.24 | 0.36 | 0.48 | 0.59 | 0.71 | 0.83 | 0.71 | 0.59 |
| +2.250  58 & 65 | 0.68 | 0.56 | 0.45 | 0.34 | 0.23 | 0.11 | 0.00 | 0.11 | 0.23 | 0.34 | 0.45 | 0.56 | 0.68 | 0.79 | 0.68 | 0.56 |
| +2.125  58 & 65 | 0.64 | 0.53 | 0.43 | 0.32 | 0.21 | 0.11 | 0.00 | 0.11 | 0.21 | 0.32 | 0.43 | 0.53 | 0.64 | 0.74 | 0.64 | 0.53 |
| +2.000  58 & 65 | 0.60 | 0.50 | 0.40 | 0.30 | 0.20 | 0.10 | 0.00 | 0.10 | 0.20 | 0.30 | 0.40 | 0.50 | 0.60 | 0.70 | 0.60 | 0.50 |
| +1.875  58 & 65 | 0.56 | 0.47 | 0.38 | 0.28 | 0.19 | 0.09 | 0.00 | 0.09 | 0.19 | 0.28 | 0.38 | 0.47 | 0.56 | 0.66 | 0.56 | 0.47 |
| +1.750  58 & 65 | 0.53 | 0.44 | 0.35 | 0.26 | 0.18 | 0.09 | 0.00 | 0.09 | 0.18 | 0.26 | 0.35 | 0.44 | 0.53 | 0.61 | 0.53 | 0.44 |
| +1.625  57.5 & 65.5 | 0.41 | 0.33 | 0.24 | 0.16 | 0.08 | 0.00 | 0.08 | 0.16 | 0.24 | 0.33 | 0.41 | 0.49 | 0.57 | 0.65 | 0.57 | 0.49 |
| +1.500  57.5 & 65.5 | 0.38 | 0.30 | 0.23 | 0.15 | 0.08 | 0.00 | 0.08 | 0.15 | 0.23 | 0.30 | 0.38 | 0.45 | 0.53 | 0.60 | 0.53 | 0.45 |
| +1.275  57 & 66 | 0.28 | 0.21 | 0.14 | 0.07 | 0.00 | 0.07 | 0.14 | 0.21 | 0.28 | 0.34 | 0.41 | 0.48 | 0.55 | 0.62 | 0.55 | 0.48 |
| +1.250  56.5 & 66.5 | 0.19 | 0.13 | 0.06 | 0.00 | 0.06 | 0.13 | 0.19 | 0.25 | 0.31 | 0.38 | 0.44 | 0.50 | 0.56 | 0.63 | 0.56 | 0.50 |
| ave Δ | 0.50 | 0.41 | 0.31 | 0.24 | 0.16 | 0.10 | 0.06 | 0.15 | 0.25 | 0.34 | 0.44 | 0.53 | 0.62 | 0.72 | 0.62 | 0.53 |

| Population f % | 5.3% | 4.8% | 4.3% | 3.7% | 3.2% | 2.6% | 2.1% | 1.7% | 1.3% | 1.0% | 0.7% | | |
|---|---|---|---|---|---|---|---|---|---|---|---|---|---|
| Std. Dev. Z Score | 0.5 | 0.6 | 0.8 | 0.9 | 1.1 | 1.2 | 1.4 | 1.5 | 1.7 | 1.8 | 2.0 | | 2 std dev |
| NPD | 63.0 | 63.5 | 64.0 | 64.5 | 65.0 | 65.5 | 66.0 | 66.5 | 67.0 | 67.5 | 68.0 | | |
| Diopter OCD | | | | | | | | | | | | ave Δ | <66 Δ |
| +2.750  58 & 65 | 0.55 | 0.41 | 0.28 | 0.14 | 0.00 | 0.14 | 0.28 | 0.41 | 0.55 | 0.69 | 0.83 | 0.46 | 62.3% |
| +2.625  58 & 65 | 0.53 | 0.39 | 0.26 | 0.13 | 0.00 | 0.13 | 0.26 | 0.39 | 0.53 | 0.66 | 0.79 | 0.44 | 76.2% |
| +2.500  58 & 65 | 0.50 | 0.38 | 0.25 | 0.13 | 0.00 | 0.13 | 0.25 | 0.38 | 0.50 | 0.63 | 0.75 | 0.42 | 76.2% |
| +2.375  58 & 65 | 0.48 | 0.36 | 0.24 | 0.12 | 0.00 | 0.12 | 0.24 | 0.36 | 0.48 | 0.59 | 0.71 | 0.40 | 76.2% |
| +2.250  58 & 65 | 0.45 | 0.34 | 0.23 | 0.11 | 0.00 | 0.11 | 0.23 | 0.34 | 0.45 | 0.56 | 0.68 | 0.38 | 76.2% |
| +2.125  58 & 65 | 0.43 | 0.32 | 0.21 | 0.11 | 0.00 | 0.11 | 0.21 | 0.32 | 0.43 | 0.53 | 0.64 | 0.36 | 89.9% |
| +2.000  58 & 65 | 0.40 | 0.30 | 0.20 | 0.10 | 0.00 | 0.10 | 0.20 | 0.30 | 0.40 | 0.50 | 0.60 | 0.34 | 89.9% |
| +1.875  58 & 65 | 0.38 | 0.28 | 0.19 | 0.09 | 0.00 | 0.09 | 0.19 | 0.28 | 0.38 | 0.47 | 0.56 | 0.32 | 96.0% |
| +1.750  58 & 65 | 0.35 | 0.26 | 0.18 | 0.09 | 0.00 | 0.09 | 0.18 | 0.26 | 0.35 | 0.44 | 0.53 | 0.29 | 96.0% |
| +1.625  57.5 & 65.5 | 0.41 | 0.33 | 0.24 | 0.16 | 0.08 | 0.00 | 0.08 | 0.16 | 0.24 | 0.33 | 0.41 | 0.28 | 96.0% |
| +1.500  57.5 & 65.5 | 0.38 | 0.30 | 0.23 | 0.15 | 0.08 | 0.00 | 0.08 | 0.15 | 0.23 | 0.30 | 0.38 | 0.26 | 96.0% |
| +1.275  57 & 66 | 0.41 | 0.34 | 0.28 | 0.21 | 0.14 | 0.07 | 0.00 | 0.07 | 0.14 | 0.21 | 0.28 | 0.26 | 96.0% |
| +1.250  56.5 & 66.5 | 0.44 | 0.38 | 0.31 | 0.25 | 0.19 | 0.13 | 0.06 | 0.00 | 0.06 | 0.13 | 0.19 | 0.26 | 96.0% |
| ave Δ | 0.44 | 0.34 | 0.25 | 0.15 | 0.06 | 0.10 | 0.16 | 0.24 | 0.31 | 0.41 | 0.50 | 0.34 | 87.0% |

However, a surprising and unexpected benefit arises if instead, the OCD settings are calculated with the method that utilizes the standard normal density calculation discovered and presented here, and considers population percentages rather than simply minimum prism. OCD settings of 59.5 mm and 63.5 mm for +2.75 Diopter reading glasses, combined with 59.0 mm and 64.0 mm for +2.63 to +2.25 Diopters, combined with 58.5 mm and 64.5 mm for +2.13 and +2.00 diopters, combined with 58.0 mm and 65.0 mm for +1.88 and +1.75 Diopters, combined with 57.5 mm and 65.5 mm for +1.63 and +1.50 Diopters, combined with 57 mm and 66.0 mm for +1.38 Diopter, combined with 56.5 mm and 66.5 mm for +1.25 Diopter all together would average 0.36Δ for all US persons within two standard deviations of the mean, or 95% of the population (Table 8). Intuition would dictate that OCD settings generating this level of average prism, higher than the example cited above, would not be best choices for a reading glass assortment. However, it has been found that these OCDs allow 92.4% of the population to experience prism below threshold levels versus only 62.3% for the settings that provide lowest overall prism. Thus, utilizing the method disclosed herein, OCD settings have been found that limit less than 3% of the population within two standard deviations of the mean to experience excessive prism—a surprising and significant improvement to any prior art and surprisingly better than OCD settings that are calculated to simply minimize overall average prism.

TABLE 8

| Population f % | 0.7% | 1.0% | 1.3% | 1.7% | 2.1% | 2.6% | 3.2% | 3.7% | 4.3% | 4.8% | 5.3% | 5.7% | 5.9% | 6.1% | 6.1% | 5.9% | 5.7% | 5.3% | 4.8% | 4.3% | 3.7% | 3.2% | 2.6% | 2.1% | 1.7% | 1.3% | 1.0% | | |
|---|---|---|---|---|---|---|---|---|---|---|---|---|---|---|---|---|---|---|---|---|---|---|---|---|---|---|---|---|---|
| Std. Dev. Z Score | (2.0) | (1.8) | (1.7) | (1.5) | (1.4) | (1.2) | (1.1) | (0.9) | (0.8) | (0.6) | (0.5) | (0.3) | (0.2) | - | 0.2 | 0.3 | 0.5 | 0.6 | 0.8 | 0.9 | 1.1 | 1.2 | 1.4 | 1.5 | 1.7 | 1.8 | 2.0 | 2 std dev | |
| NPD | 55.0 | 55.5 | 56.0 | 56.5 | 57.0 | 57.5 | 58.0 | 58.5 | 59.0 | 59.5 | 60.0 | 60.5 | 61.0 | 61.5 | 62.0 | 62.5 | 63.0 | 63.5 | 64.0 | 64.5 | 65.0 | 65.5 | 66.0 | 66.5 | 67.0 | 67.5 | 68.0 | ave Δ | <66 Δ |
| Diopter OCD | | | | | | | | | | | | | | | | | | | | | | | | | | | | | |
| +2.750  59.5 & 63.5 | 1.24 | 1.10 | 0.96 | 0.83 | 0.69 | 0.55 | 0.41 | 0.28 | 0.14 | 0.00 | 0.14 | 0.28 | 0.41 | 0.55 | 0.41 | 0.28 | 0.14 | 0.00 | 0.14 | 0.28 | 0.41 | 0.55 | 0.69 | 0.83 | 0.96 | 1.10 | 1.24 | 0.54 | 80.4% |
| +2.625  59 & 64 | 1.05 | 0.92 | 0.79 | 0.66 | 0.53 | 0.39 | 0.26 | 0.13 | 0.00 | 0.13 | 0.26 | 0.38 | 0.53 | 0.66 | 0.53 | 0.39 | 0.26 | 0.13 | 0.00 | 0.13 | 0.26 | 0.38 | 0.53 | 0.66 | 0.79 | 0.92 | 1.05 | 0.47 | 89.0% |
| +2.500  59 & 64 | 1.00 | 0.88 | 0.75 | 0.63 | 0.50 | 0.38 | 0.25 | 0.13 | 0.00 | 0.13 | 0.25 | 0.38 | 0.50 | 0.63 | 0.50 | 0.38 | 0.25 | 0.13 | 0.00 | 0.13 | 0.25 | 0.38 | 0.50 | 0.63 | 0.75 | 0.88 | 1.00 | 0.45 | 89.0% |
| +2.375  59 & 64 | 0.95 | 0.83 | 0.73 | 0.59 | 0.48 | 0.35 | 0.24 | 0.12 | 0.00 | 0.12 | 0.24 | 0.35 | 0.48 | 0.59 | 0.48 | 0.36 | 0.12 | 0.12 | 0.00 | 0.12 | 0.23 | 0.36 | 0.48 | 0.59 | 0.71 | 0.83 | 0.95 | 0.43 | 89.0% |
| +2.250  59 & 64 | 0.90 | 0.79 | 0.68 | 0.56 | 0.45 | 0.34 | 0.23 | 0.11 | 0.00 | 0.11 | 0.23 | 0.34 | 0.45 | 0.56 | 0.45 | 0.34 | 0.23 | 0.11 | 0.00 | 0.11 | 0.23 | 0.34 | 0.45 | 0.56 | 0.68 | 0.79 | 0.90 | 0.40 | 89.0% |
| +2.125  58.5 & 64.5 | 0.74 | 0.64 | 0.53 | 0.43 | 0.32 | 0.21 | 0.11 | 0.00 | 0.11 | 0.21 | 0.32 | 0.43 | 0.53 | 0.64 | 0.53 | 0.43 | 0.32 | 0.21 | 0.11 | 0.00 | 0.11 | 0.21 | 0.32 | 0.43 | 0.53 | 0.64 | 0.74 | 0.36 | 94.3% |
| +2.000  58.5 & 64.5 | 0.70 | 0.60 | 0.50 | 0.40 | 0.30 | 0.20 | 0.10 | 0.00 | 0.10 | 0.20 | 0.30 | 0.40 | 0.50 | 0.60 | 0.50 | 0.40 | 0.30 | 0.20 | 0.10 | 0.00 | 0.10 | 0.20 | 0.30 | 0.40 | 0.50 | 0.60 | 0.70 | 0.34 | 94.3% |
| +1.875  58 & 65 | 0.56 | 0.47 | 0.38 | 0.28 | 0.19 | 0.09 | 0.00 | 0.09 | 0.19 | 0.28 | 0.38 | 0.47 | 0.56 | 0.66 | 0.56 | 0.47 | 0.38 | 0.28 | 0.19 | 0.09 | 0.00 | 0.09 | 0.18 | 0.28 | 0.35 | 0.47 | 0.56 | 0.32 | 96.0% |
| +1.750  58 & 65 | 0.53 | 0.44 | 0.35 | 0.26 | 0.18 | 0.09 | 0.00 | 0.09 | 0.18 | 0.26 | 0.35 | 0.44 | 0.53 | 0.61 | 0.53 | 0.44 | 0.35 | 0.26 | 0.18 | 0.09 | 0.00 | 0.09 | 0.18 | 0.26 | 0.35 | 0.44 | 0.53 | 0.29 | 96.0% |
| +1.625  57.5 & 65.5 | 0.41 | 0.33 | 0.24 | 0.16 | 0.08 | 0.00 | 0.08 | 0.16 | 0.24 | 0.33 | 0.41 | 0.49 | 0.57 | 0.65 | 0.57 | 0.49 | 0.41 | 0.33 | 0.24 | 0.16 | 0.08 | 0.00 | 0.08 | 0.16 | 0.24 | 0.33 | 0.41 | 0.28 | 96.0% |
| +1.500  57.5 & 65.5 | 0.38 | 0.30 | 0.23 | 0.15 | 0.08 | 0.00 | 0.08 | 0.15 | 0.23 | 0.30 | 0.38 | 0.45 | 0.53 | 0.60 | 0.53 | 0.45 | 0.38 | 0.30 | 0.23 | 0.15 | 0.08 | 0.00 | 0.08 | 0.15 | 0.23 | 0.30 | 0.38 | 0.26 | 96.0% |
| +1.375  57 & 66 | 0.28 | 0.21 | 0.14 | 0.07 | 0.00 | 0.07 | 0.14 | 0.21 | 0.28 | 0.34 | 0.41 | 0.48 | 0.55 | 0.62 | 0.55 | 0.48 | 0.41 | 0.34 | 0.28 | 0.21 | 0.14 | 0.07 | 0.00 | 0.07 | 0.14 | 0.21 | 0.28 | 0.26 | 96.0% |
| +1.275  57 & 66 | 0.21 | 0.14 | 0.06 | 0.00 | 0.06 | 0.13 | 0.19 | 0.25 | 0.31 | 0.38 | 0.44 | 0.50 | 0.56 | 0.63 | 0.56 | 0.50 | 0.44 | 0.38 | 0.31 | 0.25 | 0.19 | 0.13 | 0.06 | 0.00 | 0.06 | 0.13 | 0.19 | 0.26 | 96.0% |
| +1.250  56.5 & 66.5 | 0.19 | 0.13 | 0.06 | 0.00 | 0.06 | 0.13 | 0.19 | 0.25 | 0.31 | 0.38 | 0.44 | 0.50 | 0.56 | 0.63 | 0.56 | 0.50 | 0.44 | 0.38 | 0.31 | 0.25 | 0.19 | 0.13 | 0.06 | 0.00 | 0.06 | 0.13 | 0.19 | | |
| ave Δ | 0.69 | 0.59 | 0.49 | 0.39 | 0.30 | 0.22 | 0.16 | 0.13 | 0.14 | 0.21 | 0.31 | 0.41 | 0.51 | 0.61 | 0.51 | 0.41 | 0.31 | 0.21 | 0.14 | 0.13 | 0.16 | 0.22 | 0.30 | 0.39 | 0.49 | 0.59 | 0.69 | 0.36 | 92.4% |

Surprisingly, the best OCD combinations of settings then emerge as those capable of minimizing prism for the highest percentage of the population, not necessarily those generating the lowest overall prism. This can be repeated for two, or three, or more OCD settings for each Diopter/NPD combination for any reading distance and any population mix of race or gender. There is a practical limit to the number of ready-made OCD settings that can be inventoried by a supplier or retailer. So long as the prism tolerance level is met and prism is kept to a minimum for the maximum percentage of the target population's NPD settings, additional OCD settings are not beneficial. Thus, the methods provided herein, for the first time, reveal a new means for calculating and arriving at the most economical inventory mix that will provide the most optimal vision for the broadest population of reading glass users.

Whereas the novel use of multiple OCD settings may necessarily increase the inventory required for wholesale or retail vendors of reading glasses, limiting prism with the fewest number of OCDs and without a simultaneous and unnecessary expansion of inventory is a practical issue. A non-obvious solution is hereby offered to address this issue. Reading glasses have typically been available from about +1.00 to about +3.00 diopters in 0.25 Diopter steps, thus requiring about nine different powers for inventory. If instead, the assortment of reading glasses utilized diopter multiples of 0.125 (a unique and previously undisclosed Diopter multiple for reading glasses), in increments of 0.50 diopters, the vendor would yield unexpected benefits in inventory savings and requirements.

As those of ordinary skill in the art can appreciate, the same ISO standard that specifies the prism effect to be less than 0.66Δ, also calls for the reading glass lens power to be within 0.13 diopters of the specified diopter power. See ISO 16034: "Ophthalmic optics—Specifications for single-vision ready-to-wear near-vision spectacles". Since the 0.125 diopter steps specified are below the ISO standard and observable threshold, they can be considered to be simultaneously equivalent to two different diopter powers: that power which is just 0.125 higher and that power which is just 0.125 lower. For example, a +1.625 diopter reading glass is essentially and simultaneously equal to both a +1.50 diopter reading glass and a +1.75 diopter reading glass. Now, an additional method of creating new increments in 0.50 steps, rather than conventional 0.25 steps, teaches that the next highest Diopter required, +2.125 will be equivalent to a +2.00 and +2.25 diopter power. Thus, it is learned that a new method whereby 4 unique diopter powers in 0.25 steps can be replaced by 2 unique diopter powers in 0.125 diopter multiples separated by 0.50 diopter steps. This teaching of 0.125 diopter multiples in 0.50 increments then offers the surprising benefit of cutting the inventory requirement by 50%:

TABLE 9

| NEW Scale 1 | Old | NEW Scale 2 |
|---|---|---|
| | +3.000 | |
| +2.875 | | |
| | +2.750 | |
| | | +2.625 |
| | +2.500 | |
| +2.375 | | |
| | +2.250 | |
| | | +2.125 |
| | +2.000 | |
| +1.875 | | |
| | +1.750 | |
| | | +1.625 |
| | +1.500 | |
| +1.375 | | |
| | +1.250 | |
| | | +1.125 |
| | +1.000 | |
| +0.875 | | |
| | +0.750 | |
| | | +0.625 |
| | +0.500 | |
| +0.375 | | |
| | +0.250 | |
| TOTAL 6 | 12 | 5 |

In Table 9, two new previously undisclosed scales derived from this new method are provided, in which a first scale is provided wherein the +0.25 and +0.50 can be replaced with a +0.375, and the +0.75 and +1.00 can be replaced with a +0.875 and the +1.25 and +1.50 are replaced with a +1.375 and the +1.75 and +2.00 are replaced with a +1.875 and the +2.25 and +2.50 are replaced with a +2.375 and the +2.75 and +3.00 are replaced with a +2.875 or a second scale is provided wherein the +0.050 and +0.75 are replaced with a +0.625 and the +1.00 and +1.25 are replaced by a +1.125 and the +1.50 and +1.75 are replaced by a +1.625 and the +2.00 and +2.25 are replaced by a +2.125 Diopter lens, and the +2.50 and +2.75 are replaced by a +2.625 Diopter power lens. As those of ordinary skill in the art can appreciate, with just four lens powers required in multiples of 0.125 and in steps of 0.50, all eight conventional Diopters between +1.00 and +2.75 can be replaced, thus cutting the inventory by 50%. This teaching can benefit reading glass manufacturers, suppliers and retailers even without further application of methods disclosed here to minimize prism. Similarly, the method for minimizing prism does not necessarily have to include the new scales disclosed here.

However, when the methods for minimizing Diopter inventory are combined with the methods taught here for minimizing prism, the increased number of OCD settings essential to minimizing prism will not substantially increase inventory requirements. The same Diopter power range coverage and inventory savings could not be accomplished with any 0.25 Diopter multiples even if steps are increased to say, 0.50 Diopter steps, nor would 1.00 Diopter steps aid as there would be large gaps in the customary conventional scale. The use of 0.125 Diopter multiples in 0.50 steps provides unique and exceptional benefits of inventory savings, even for conventional reading glasses where prism reduction is not practiced. When combined with the methods for prism reduction disclosed herein, the two methods result in the most precise and compact reading glass assortment possible.

There is yet another benefit seen in the prism reduction method presented here. Whereas the prior art describes one OCD or utilizes one manufacturer's chosen OCD setting for all reading glass Diopter powers, there is an advantage to adjusting the OCDs by Diopter, thereby expanding the percentage of the population that is able to wear the reading glasses with a minimum of prism. In minimizing prism for the greatest percentage of the population, we see above that each Diopter may call for different OCD settings. These OCD settings tend to widen as the Diopter decreases, or narrow in successively higher Diopter powers. In the following example, the OCDs were selected from the average of the best settings that minimize prism across all Diopters. However, as seen below (Table 10), if identical OCD pair settings are repeated for all Diopters, the percentage of the population experiencing below threshold prism is decreased (from 92% down to just 82%). In other words, the population percentage experiencing detrimentally elevated prism is increased if OCD pair settings do not vary by Diopter.

TABLE 10

| Population f % | 0.7% | 1.0% | 1.3% | 1.7% | 2.1% | 2.6% | 3.2% | 3.7% | 4.3% | 4.8% | 5.3% | 5.7% | 5.9% | 6.1% | 6.1% | 5.9% | 5.7% | 5.3% | 4.8% | 4.3% | 3.7% | 3.2% | 2.6% | 2.1% | 1.7% | 1.3% | 1.0% | | |
|---|---|---|---|---|---|---|---|---|---|---|---|---|---|---|---|---|---|---|---|---|---|---|---|---|---|---|---|---|---|
| Std. Dev. Z Score | (2.0) | (1.8) | (1.7) | (1.5) | (1.4) | (1.2) | (1.1) | (0.9) | (0.8) | (0.6) | (0.5) | (0.3) | (0.2) | - | 0.2 | 0.3 | 0.5 | 0.6 | 0.8 | 0.9 | 1.1 | 1.2 | 1.4 | 1.5 | 1.7 | 1.8 | 2.0 | | |
| NPD | 55.0 | 55.5 | 56.0 | 56.5 | 57.0 | 57.5 | 58.0 | 58.5 | 59.0 | 59.5 | 60.0 | 60.5 | 61.0 | 61.5 | 62.0 | 62.5 | 63.0 | 63.5 | 64.0 | 64.5 | 65.0 | 65.5 | 66.0 | 66.5 | 67.0 | 67.5 | 68.0 | ave Δ | <66 Δ |
| Diopter OCD | | | | | | | | | | | | | | | | | | | | | | | | | | | | | |
| −2.750  57.5 & 65.5 | 0.69 | 0.55 | 0.41 | 0.28 | 0.14 | 0.00 | 0.14 | 0.28 | 0.41 | 0.55 | 0.69 | 0.83 | 0.96 | 1.10 | 0.96 | 0.83 | 0.69 | 0.55 | 0.41 | 0.28 | 0.14 | 0.00 | 0.14 | 0.28 | 0.41 | 0.55 | 0.69 | 0.48 | 53.7% |
| −2.625  57.5 & 65.5 | 0.66 | 0.53 | 0.39 | 0.26 | 0.13 | 0.00 | 0.13 | 0.26 | 0.39 | 0.53 | 0.66 | 0.79 | 0.92 | 1.05 | 0.92 | 0.79 | 0.66 | 0.53 | 0.39 | 0.26 | 0.13 | 0.00 | 0.13 | 0.26 | 0.39 | 0.53 | 0.66 | 0.46 | 66.4% |
| −2.500  57.5 & 65.5 | 0.63 | 0.50 | 0.38 | 0.25 | 0.13 | 0.00 | 0.13 | 0.25 | 0.38 | 0.50 | 0.63 | 0.75 | 0.88 | 1.00 | 0.88 | 0.75 | 0.63 | 0.50 | 0.38 | 0.25 | 0.13 | 0.00 | 0.13 | 0.25 | 0.38 | 0.50 | 0.63 | 0.44 | 66.4% |
| −2.375  57.5 & 65.5 | 0.59 | 0.48 | 0.36 | 0.24 | 0.12 | 0.00 | 0.12 | 0.24 | 0.36 | 0.48 | 0.59 | 0.71 | 0.83 | 0.95 | 0.83 | 0.71 | 0.59 | 0.48 | 0.36 | 0.24 | 0.12 | 0.00 | 0.12 | 0.24 | 0.36 | 0.48 | 0.59 | 0.41 | 66.4% |
| −2.250  57.5 & 65.5 | 0.56 | 0.45 | 0.34 | 0.23 | 0.11 | 0.00 | 0.11 | 0.23 | 0.34 | 0.45 | 0.56 | 0.68 | 0.79 | 0.90 | 0.79 | 0.68 | 0.56 | 0.45 | 0.34 | 0.23 | 0.11 | 0.00 | 0.11 | 0.23 | 0.34 | 0.45 | 0.56 | 0.39 | 66.4% |
| −2.125  57.5 & 65.5 | 0.53 | 0.43 | 0.32 | 0.21 | 0.11 | 0.00 | 0.11 | 0.21 | 0.32 | 0.43 | 0.53 | 0.64 | 0.74 | 0.85 | 0.74 | 0.64 | 0.53 | 0.43 | 0.32 | 0.21 | 0.11 | 0.00 | 0.11 | 0.21 | 0.32 | 0.43 | 0.53 | 0.37 | 77.9% |
| −2.000  57.5 & 65.5 | 0.50 | 0.40 | 0.30 | 0.20 | 0.10 | 0.00 | 0.10 | 0.20 | 0.30 | 0.40 | 0.50 | 0.60 | 0.70 | 0.80 | 0.70 | 0.60 | 0.50 | 0.40 | 0.30 | 0.20 | 0.10 | 0.00 | 0.10 | 0.20 | 0.30 | 0.40 | 0.50 | 0.35 | 77.9% |
| −1.875  57.5 & 65.5 | 0.47 | 0.38 | 0.28 | 0.19 | 0.09 | 0.00 | 0.09 | 0.19 | 0.28 | 0.38 | 0.47 | 0.56 | 0.66 | 0.75 | 0.66 | 0.56 | 0.47 | 0.38 | 0.28 | 0.19 | 0.09 | 0.00 | 0.09 | 0.19 | 0.28 | 0.38 | 0.47 | 0.33 | 89.9% |
| −1.750  57.5 & 65.5 | 0.44 | 0.35 | 0.26 | 0.18 | 0.09 | 0.00 | 0.09 | 0.18 | 0.26 | 0.35 | 0.44 | 0.53 | 0.61 | 0.70 | 0.61 | 0.53 | 0.44 | 0.35 | 0.26 | 0.18 | 0.09 | 0.00 | 0.09 | 0.18 | 0.26 | 0.35 | 0.44 | 0.30 | 89.9% |
| −1.625  57.5 & 65.5 | 0.41 | 0.33 | 0.24 | 0.16 | 0.08 | 0.00 | 0.08 | 0.16 | 0.24 | 0.33 | 0.41 | 0.49 | 0.57 | 0.65 | 0.57 | 0.49 | 0.41 | 0.33 | 0.24 | 0.16 | 0.08 | 0.00 | 0.08 | 0.16 | 0.24 | 0.33 | 0.41 | 0.28 | 96.0% |
| −1.500  57.5 & 65.5 | 0.38 | 0.30 | 0.23 | 0.15 | 0.08 | 0.00 | 0.08 | 0.15 | 0.23 | 0.30 | 0.38 | 0.45 | 0.53 | 0.60 | 0.53 | 0.45 | 0.38 | 0.30 | 0.23 | 0.15 | 0.08 | 0.00 | 0.08 | 0.15 | 0.23 | 0.30 | 0.38 | 0.26 | 96.0% |
| −1.375  57.5 & 65.5 | 0.34 | 0.28 | 0.21 | 0.14 | 0.07 | 0.00 | 0.07 | 0.14 | 0.21 | 0.28 | 0.34 | 0.41 | 0.48 | 0.55 | 0.48 | 0.41 | 0.34 | 0.28 | 0.21 | 0.14 | 0.07 | 0.00 | 0.07 | 0.14 | 0.21 | 0.28 | 0.34 | 0.24 | 96.0% |
| −1.275  57.5 & 65.5 | 0.31 | 0.25 | 0.19 | 0.13 | 0.06 | 0.00 | 0.06 | 0.13 | 0.19 | 0.25 | 0.31 | 0.38 | 0.44 | 0.50 | 0.44 | 0.38 | 0.31 | 0.25 | 0.19 | 0.13 | 0.06 | 0.00 | 0.06 | 0.13 | 0.19 | 0.25 | 0.31 | 0.22 | 96.0% |
| −1.250  57.5 & 65.5 | 0.28 | 0.23 | 0.17 | 0.11 | 0.06 | 0.00 | 0.06 | 0.11 | 0.17 | 0.23 | 0.28 | 0.34 | 0.39 | 0.45 | 0.39 | 0.34 | 0.28 | 0.23 | 0.17 | 0.11 | 0.06 | 0.00 | 0.06 | 0.11 | 0.17 | 0.23 | 0.28 | 0.20 | 96.0% |
| −1.125  57.5 & 65.5 | 0.25 | 0.20 | 0.15 | 0.10 | 0.05 | 0.00 | 0.05 | 0.10 | 0.15 | 0.20 | 0.25 | 0.30 | 0.35 | 0.40 | 0.35 | 0.30 | 0.25 | 0.20 | 0.15 | 0.10 | 0.05 | 0.00 | 0.05 | 0.10 | 0.15 | 0.20 | 0.25 | 0.17 | 96.0% |
| ave Δ | 0.47 | 0.38 | 0.28 | 0.19 | 0.09 | 0.00 | 0.09 | 0.19 | 0.28 | 0.38 | 0.47 | 0.56 | 0.65 | 0.75 | 0.65 | 0.56 | 0.47 | 0.38 | 0.28 | 0.19 | 0.09 | 0.00 | 0.09 | 0.19 | 0.28 | 0.38 | 0.47 | 0.33 | 82.1% |

Figure 3:
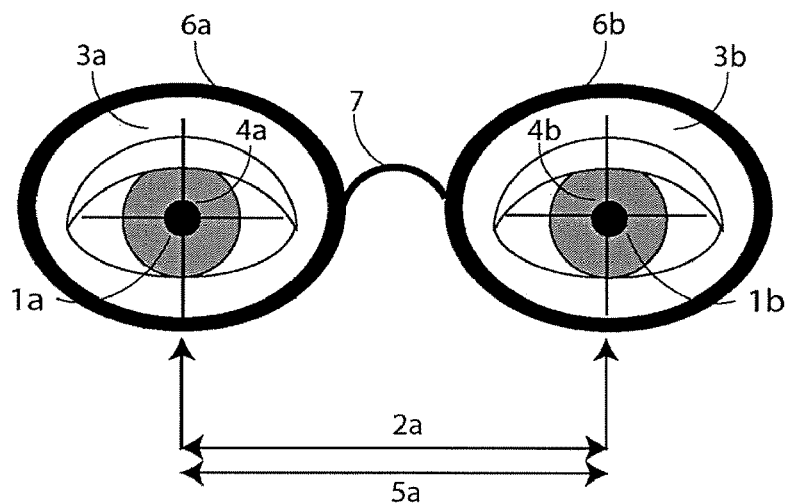
FIG. 3 presents a diagram showing a user wearing eyeglasses where the user's PD coincides with the OCD of the eyeglasses.
Figure 4:
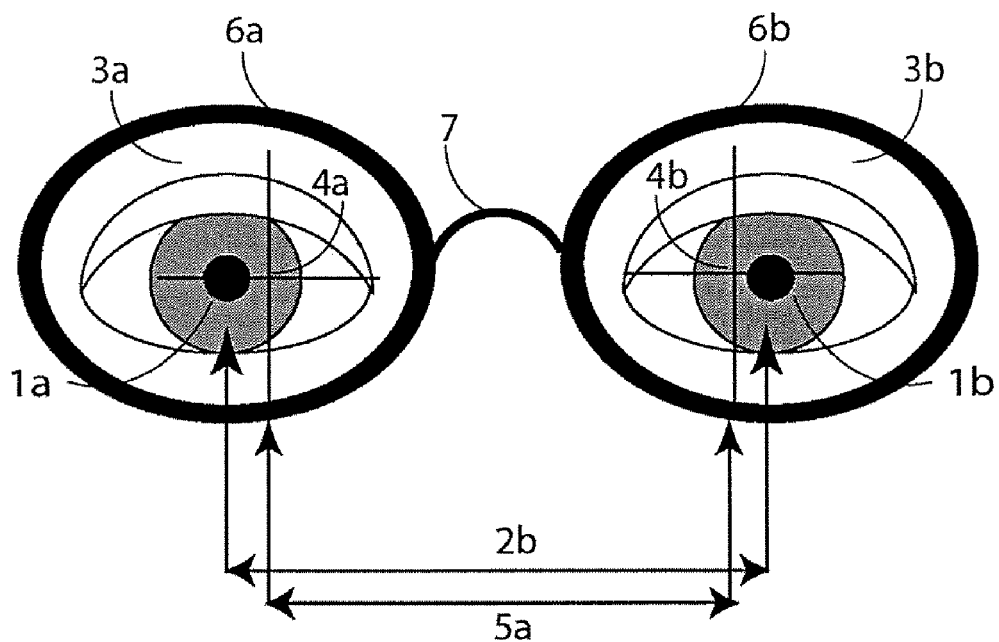
FIG. 4 presents a diagram showing a user wearing eyeglasses where the user's PD is greater than the OCD of the eyeglasses.
Figure 5:
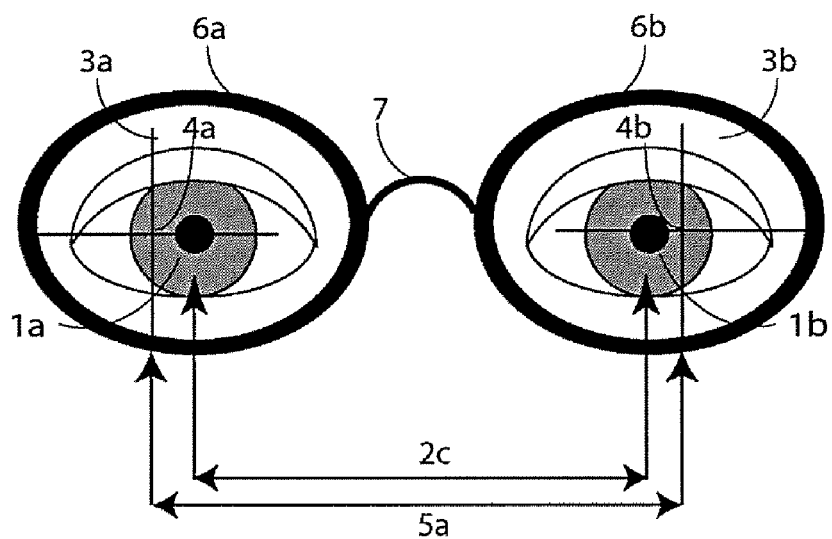
FIG. 5 presents a diagram showing a user wearing eyeglasses where the user's PD is smaller than the OCD of the eyeglasses.
Figure 6:
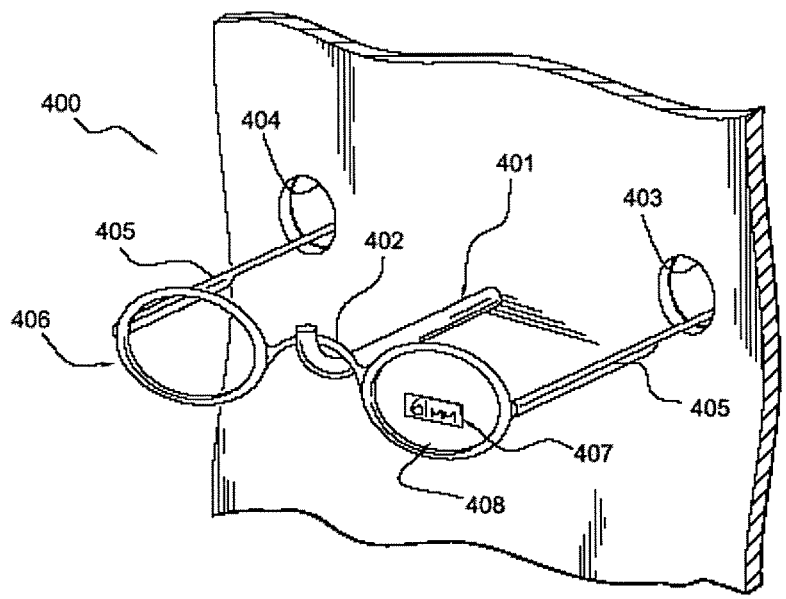
FIG. 6 presents one example of a holder for removably retaining eyeglasses on an eyeglass display.

A non-limiting example of the eyeglasses according to certain aspects of the present invention is shown in FIG. 3. The lenses 3a and 3b are held in place by any eyeglass frame, 6a and 6b, which hold the lenses in place. The lenses are spaced apart by the nosepiece or bridge 7 of the eyeglass frame. The lenses are held in front of a person's eyes and are separated by the nose piece. The frame will have various other components and features such as temples and, optionally, nose pads (not shown). The OCD of the eyeglasses shown in FIG. 3 coincide with the NPD of the user.

The lenses of the eyeglasses according to certain aspects of the present invention may be made of any lens material, including, but not limited to plastic, polycarbonate, acrylic, and glass, or any other less material suitable for ophthalmic lenses. The lens shape may be concave and convex and may have a variety of colors or coatings (e.g., an antireflective, or photochromic coating).

The frame of the eyeglasses according to certain aspects of the present invention may be made of any material, including, but not limited to metal, plastic, nylon, polycarbonate or combinations of the aforementioned materials.

The eyeglasses according to certain aspects of the present invention may be of any lens Diopter power, and embrace any configuration such as single vision lenses, bifocal, trifocal or progressive addition lenses. For example, the Diopter power may range from about +0.25 to about +3.00; or from about +0.375 to +2.875; or from about +0.625 to about +2.625; or from about +1.00 to about +3.00; or from about +1.00 to about +2.75; or from about +1.00 to about +2.00; or from about +2.00 to about +3.00. In one embodiment, the Diopter power is about +1.00; or about +1.25; or about +1.50; or about +1.75; or about +2.00; or about +2.25; or about +2.50; or about +2.75; or about +3.00. The steps between Diopter settings may be in any gradient, e.g., 0.125 Diopter steps, or 0.25 Diopter steps, or 0.50 Diopter steps, or 0.75 Diopter steps, or 1.00 Diopter steps, etc. However, as noted above, the method whereby 0.125 Diopter multiples are combined in 0.50 incremental steps offers a novel and unique case different from all other conventional Diopter scales that has unexpected benefits for minimizing inventory and when combined with the method for both minimizing prism without a concomitant rise in inventory, thus offering a significant improvement upon conventional Diopter scales.

As noted above, the eyeglasses according to certain aspects of the present invention may comprise eyeglasses with two or three OCDs to accommodate users with different PDs. The percentage of the population that will benefit from below threshold prism levels is dependent upon the number of OCDs chosen.

In a preferred embodiment, 2 OCDs would be required if the percentage of the population that can benefit from single OCD for each gender and unisex gender are deemed insufficient. For example, in Table 6, it is seen that in allowing for 40 cm viewing distance, for all races in the US general population according to US Census estimates through the year 2027, the methods described herein find that a single OCD for each gender is sufficient to limit prism to less than 0.66Δ for 68% of the population for each Diopter power equal to and less than +2.125, and on average for 68% of all Diopter powers between and including +3.00 to +1.25. In a preferred embodiment, wherein more than 68% of the population is required to see through a given Diopter power reading glass with less than threshold prism, two OCDs are required for Diopter powers equal to +2.25 or more. Similarly, wherein more than 80% of the population is required to see through a given Diopter power reading glass with less than threshold prism, two OCDs are required for Diopter powers equal to +1.75 or more. The mix of one and two OCDs that change by gender and Diopter and will keep prism at or below threshold for 80% or more of the population are shown in Table 11.

TABLE 11 min # of OCD settings that allow max Pop % to experience <.66Δ

| | unisex | | | male | | | female | | |
|---|---|---|---|---|---|---|---|---|---|
| Diopter | OCDs | OCD 1 is set at | when combined with OCD 2 set at | OCDs | OCD 1 is preferably set at | when combined with OCD 2 set at | OCDs | OCD 1 is preferably set at | when combined with OCD 2 set at |
| 3.00 | 2 | 59.5 | 63.5 80% | 2 | 61.0 | 65.0 82% | 2 | 58.5 | 62.5 81% |
| 2.88 | 2 | 59.5 | 63.5 80% | 2 | 61.0 | 65.0 82% | 2 | 58.5 | 62.5 81% |
| 2.75 | 2 | 59.5 | 63.5 80% | 2 | 61.0 | 65.0 82% | 2 | 58.5 | 62.5 81% |
| 2.63 | 2 | 59.0 | 64.0 89% | 2 | 60.5 | 65.5 90% | 2 | 58.0 | 63.0 89% |
| 2.50 | 2 | 59.0 | 64.0 89% | 2 | 60.5 | 65.5 90% | 2 | 58.0 | 63.0 89% |
| 2.38 | 2 | 59.0 | 64.0 89% | 2 | 60.5 | 65.5 90% | 2 | 58.0 | 63.0 89% |
| 2.25 | 2 | 59.0 | 64.0 89% | 2 | 60.5 | 65.5 90% | 2 | 58.0 | 63.0 89% |
| 2.13 | 2 | 58.5 | 64.5 94% | 2 | 60.0 | 66.0 95% | 2 | 57.5 | 63.5 95% |
| 2.00 | 2 | 58.5 | 64.5 94% | 2 | 60.0 | 66.0 95% | 2 | 57.5 | 63.5 95% |
| 1.88 | 2 | 58.0 | 65.0 96% | 2 | 59.5 | 66.5 97% | 2 | 57.0 | 64.0 96% |
| 1.75 | 2 | 58.0 | 65.0 96% | 2 | 59.5 | 66.5 97% | 2 | 57.0 | 64.0 96% |
| 1.63 | 1 | 61.5 80% | | 1 | 63.0 82% | | 1 | 60.5 81% | |

TABLE 11-continued min # of OCD settings that allow max Pop % to experience <.66Δ

| Diopter | unisex | | | male | | | female | | |
|---|---|---|---|---|---|---|---|---|---|
| | OCDs | OCD 1 is set at | when combined with OCD 2 set at | OCDs | OCD 1 is preferably set at | when combined with OCD 2 set at | OCDs | OCD 1 is preferably set at | when combined with OCD 2 set at |
| 1.50 | 1 | 61.5 | 80% | 1 | 63.0 | 82% | 1 | 60.5 | 81% |
| 1.38 | 1 | 61.5 | 85% | 1 | 63.0 | 87% | 1 | 60.5 | 85% |
| 1.25 | 1 | 61.5 | 89% | 1 | 63.0 | 90% | 1 | 60.5 | 89% |
| 1.13 | 1 | 61.5 | 92% | 1 | 63.0 | 93% | 1 | 60.5 | 92% |
| 1.00 | 1 | 61.5 | 96% | 1 | 63.0 | 97% | 1 | 60.5 | 96% |
| 0.88 | 1 | 61.5 | 98% | 1 | 63.0 | 97% | 1 | 60.5 | 96% |
| 0.75 | 1 | 61.5 | 100% | 1 | 63.0 | 97% | 1 | 60.5 | 96% |
| 0.63 | 1 | 61.5 | 100% | 1 | 63.0 | 97% | 1 | 60.5 | 96% |
| 0.50 | 1 | 61.5 | 100% | 1 | 63.0 | 97% | 1 | 60.5 | 96% |
| 0.38 | 1 | 61.5 | 100% | 1 | 63.0 | 97% | 1 | 60.5 | 96% |
| 0.25 | 1 | 61.5 | 100% | 1 | 63.0 | 97% | 1 | 60.5 | 96% |

In a preferred embodiment, as noted in Table 11, when the prism is to be limited to 0.66Δ or less for 80% or more of the population served, the methods disclosed herein provide multiple and unique OCD settings by gender and Diopter power for 40 cm viewing distance and considering all races in the US, wherein said OCD 1 is set at 59.5 mm when combined with OCD 2 set at 63.5 mm for unisex reading glasses with +3.000 power Diopter to and including +2.750 power Diopter, and wherein said OCD 1 is set at 59 mm when combined with OCD 2 set at 64 mm for unisex reading glasses with +2.625 power Diopter to and including +2.250 power Diopter, and wherein said OCD 1 is set at 58.5 mm when combined with OCD 2 set at 64.5 mm for unisex reading glasses with +2.125 power Diopter to and including +2.000 power Diopter, and wherein said OCD 1 is set at 58 mm when combined with OCD 2 set at 65 mm for unisex reading glasses with +1.875 power Diopter to and including +1.750 power Diopter, and wherein a single OCD set at 61.5 mm for unisex reading glasses with +1.625 power Diopter or less.

In a preferred embodiment for males, as noted in Table 11, said OCD 1 is set at 61 mm when combined with OCD 2 set at 65 mm for male style reading glasses with +3.000 power Diopter to and including +2.750 power Diopter, and wherein said OCD 1 is set at 60.5 mm when combined with OCD 2 set at 65.5 mm for male style reading glasses with +2.625 power Diopter to and including +2.250 power Diopter, and wherein said OCD 1 is set at 60 mm when combined with OCD 2 set at 66 mm for male style reading glasses with +2.125 power Diopter to and including +2.000 power Diopter, and wherein said OCD 1 is set at 59.5 mm when combined with OCD 2 set at 66.5 mm for male style reading glasses with +1.875 power Diopter to and including +1.750 power Diopter, and wherein said OCD 1 is set at 63 mm for male style reading glasses with +1.625 power Diopter or less.

In a preferred embodiment for females, as noted in Table 11, said OCD 1 is set at 58.5 mm when combined with OCD 2 set at 62.5 mm for female style reading glasses with +3.000 power Diopter to and including +2.750 power Diopter, and wherein said OCD 1 is set at 58 mm when combined with OCD 2 set at 63 mm for female style reading glasses with +2.625 power Diopter to and including +2.250 power Diopter, and wherein said OCD 1 is set at 57.5 mm when combined with OCD 2 set at 63.5 mm for female style reading glasses with +2.125 power Diopter to and including +2.000 power Diopter, and wherein said OCD 1 is set at 57 mm when combined with OCD 2 set at 64 mm for female style reading glasses with +1.875 power Diopter to and including +1.75 power Diopter, and wherein said OCD 1 is set at 60.5 mm for female style reading glasses with +1.625 power Diopter or less.

TABLE 12 min # of OCD settings that allow max Pop % to experience <.66Δ

| Diopter | unisex | | | | male | | | female | | |
|---|---|---|---|---|---|---|---|---|---|---|
| | OCDs | OCD 1 is set at | when combined with OCD 2 set at | OCD 3 set at | OCDs | OCD 1 is preferably set at | when combined with OCD 2 set at | OCDs | OCD 1 is preferably set at | when combined with OCD 2 set at |
| 3.00 | 2 | 61.0 | 65.0 | 80% | 2 | 63.0 | 67.0 | 82% | 2 | 60.0 | 64.0 | 81% |

TABLE 12-continued min # of OCD settings that allow max Pop % to experience <.66Δ

| | unisex | | | | male | | | female | | |
|---|---|---|---|---|---|---|---|---|---|---|
| Diopter | OCDs | OCD 1 is set at | when combined with OCD 2 set at | OCD 3 set at | OCDs | OCD 1 is preferably set at | when combined with OCD 2 set at | OCDs | OCD 1 is preferably set at | when combined with OCD 2 set at |
| 2.88 | 2 | 61.0 | 65.0 80% | | 2 | 63.0 82% | 67.0 | 2 | 60.0 81% | 64.0 |
| 2.75 | 2 | 61.0 | 65.0 80% | | 2 | 63.0 82% | 67.0 | 2 | 60.0 81% | 64.0 |
| 2.63 | 2 | 60.5 | 65.5 89% | | 2 | 62.5 90% | 67.5 | 2 | 59.5 89% | 64.5 |
| 2.50 | 2 | 60.5 | 65.5 89% | | 2 | 62.5 90% | 67.5 | 2 | 59.5 89% | 64.5 |
| 2.38 | 2 | 60.5 | 65.5 89% | | 2 | 62.5 90% | 67.5 | 2 | 59.5 89% | 64.5 |
| 2.25 | 2 | 60.5 | 65.5 89% | | 2 | 62.5 90% | 67.5 | 2 | 59.5 89% | 64.5 |
| 2.13 | 2 | 60.0 | 66.0 94% | | 2 | 62.0 95% | 68.0 | 2 | 59.0 95% | 65.0 |
| 2.00 | 2 | 60.0 | 66.0 94% | | 2 | 62.0 95% | 68.0 | 2 | 59.0 95% | 65.0 |
| 1.88 | 2 | 59.5 | 66.5 96% | | 2 | 61.5 97% | 68.5 | 2 | 58.5 96% | 65.5 |
| 1.75 | 2 | 59.5 | 66.5 96% | | 2 | 61.5 97% | 68.5 | 2 | 58.5 96% | 65.5 |
| 1.63 | 1 | 63.0 80% | | | 1 | 65.0 82% | | 1 | 62.0 81% | |
| 1.50 | 1 | 63.0 80% | | | 1 | 65.0 82% | | 1 | 62.0 81% | |
| 1.38 | 1 | 63.0 85% | | | 1 | 65.0 87% | | 1 | 62.0 85% | |
| 1.25 | 1 | 63.0 89% | | | 1 | 65.0 90% | | 1 | 62.0 89% | |
| 1.13 | 1 | 63.0 92% | | | 1 | 65.0 93% | | 1 | 62.0 92% | |
| 1.00 | 1 | 63.0 96% | | | 1 | 65.0 97% | | 1 | 62.0 96% | |
| 0.88 | 1 | 63.0 98% | | | 1 | 65.0 97% | | 1 | 62.0 96% | |
| 0.75 | 1 | 63.0 100% | | | 1 | 65.0 97% | | 1 | 62.0 96% | |
| 0.63 | 1 | 63.0 100% | | | 1 | 65.0 97% | | 1 | 62.0 96% | |
| 0.50 | 1 | 63.0 100% | | | 1 | 65.0 97% | | 1 | 62.0 96% | |
| 0.38 | 1 | 63.0 100% | | | 1 | 65.0 97% | | 1 | 62.0 96% | |
| 0.25 | 1 | 63.0 100% | | | 1 | 65.0 97% | | 1 | 62.0 96% | |

In a preferred embodiment, as noted in Table 12, computer glasses are intended to be utilized for intermediate distance viewing, such as a computer at 76.2 cm from the eye, and the prism is to be limited to 0.66Δ or less for 80% or more of the population served. The methods disclosed herein provide multiple and unique OCD settings by gender and Diopter power considering all races in the US, wherein said OCD 1 is set at 61 mm when combined with OCD 2 set at 65 mm for unisex computer glasses with +3.000 power Diopter to and including +2.750 power Diopter, and wherein said OCD 1 is set at 60.5 mm when combined with OCD 2 set at 65.5 mm for unisex computer glasses with +2.625 power Diopter to and including +2.250 power Diopter, and wherein said OCD 1 is set at 60 mm when combined with OCD 2 set at 66 mm for unisex computer glasses with +2.125 power Diopter to and including +2.000 power Diopter, and wherein said OCD 1 is set at 59.5 mm when combined with OCD 2 set at 66.5 mm for unisex computer glasses with +1.875 power Diopter to and including +1.750 power Diopter, and wherein a single OCD 1 is set at 63 mm for unisex computer glasses with +1.625 power Diopter or less.

Another preferred embodiment, as noted in Table 12, is for males using computer glasses wherein said OCD 1 is set at 63 mm when combined with OCD 2 set at 67 mm for male computer glasses with +3.000 power Diopter to and including +2.750 power Diopter, and wherein said OCD 1 is set at 62.5 mm when combined with OCD 2 set at 67.5 mm for male computer glasses with +2.625 power Diopter to and including +2.250 power Diopter, and wherein said OCD 1 is set at 62 mm when combined with OCD 2 set at 68 mm for male computer glasses with +2.125 power Diopter to and including +2.000 power Diopter, and wherein said OCD 1 is set at 61.5 mm when combined with OCD 2 set at 68.5 mm for male computer glasses with +1.875 power Diopter to and including +1.750 power Diopter, and wherein a single OCD 1 is set at 65 mm for male computer glasses with +1.625 power Diopter or less.

Another preferred embodiment, as noted in Table 12, is for females using computer glasses wherein said OCD 1 is set at 60 mm when combined with OCD 2 set at 64 mm for female computer glasses with +3.000 power Diopter to and including +2.750 power Diopter, and wherein said OCD 1 is set at 59.5 mm when combined with OCD 2 set at 64.5 mm for female computer glasses with +2.625 power Diopter to and including +2.250 power Diopter, and wherein said OCD 1 is set at 59 mm when combined with OCD 2 set at 65 mm for female computer glasses with +2.125 power Diopter to and including +2.000 power Diopter, and wherein said OCD 1 is set at 58.5 mm when combined with OCD 2 set at 65.5 mm for female computer glasses with +1.875 power Diopter to and including +1.750 power Diopter, and wherein a single OCD 1 is set at 62 mm for female computer glasses with +1.625 power Diopter or less.

In another preferred embodiment, 3 OCDs would be required if the percentage of the population that can benefit from single and or two OCDs for each gender and unisex gender are deemed insufficient. For example, in Table 13, it is seen that in allowing for 40 cm viewing distance, for all races in the US general population according to US Census estimates through the year 2027, the methods described herein indicate that a single OCD for each gender is sufficient to limit prism to less than 0.66Δ for 95% of the population for each Diopter power equal to and less than +1.000, and that 2 OCDs are sufficient for Diopters from +1.125 up to +1.875 for unisex and up to +2.000 for men and women. In a preferred embodiment, 3 OCDs are required to limit prism to less than 0.66Δ for 95% of the population for each Diopter power beyond these, with the OCD settings shown in Table 13.

TABLE 13 min # of OCD settings that allow experience <.66Δ

| | unisex | | | male | | | | female | | | |
|---|---|---|---|---|---|---|---|---|---|---|---|
| Diopter | OCDs | OCD 1 is set at | when combined with OCD 2 set at | when combined with OCD 3 set at | OCDs | OCD 1 is preferably set at | when combined with OCD 2 set at | when combined with OCD 3 set at | OCDs | OCD 1 is preferably set at | when combined with OCD 2 set at | when combined with OCD 3 set at |
| 3.00 | 3 | 57.0 | 61.5 96% | 66.0 | 3 | 58.5 | 63.0 97% | 67.5 | 3 | 56.0 | 60.5 96% | 65.0 |
| 2.88 | 3 | 57.0 | 61.5 96% | 66.0 | 3 | 58.5 | 63.0 97% | 67.5 | 3 | 56.0 | 60.5 96% | 65.0 |
| 2.75 | 3 | 57.0 | 61.5 96% | 66.0 | 3 | 58.5 | 63.0 97% | 67.5 | 3 | 56.0 | 60.5 96% | 65.0 |
| 2.63 | 3 | 56.0 | 61.5 96% | 67.0 | 3 | 57.5 | 63.0 97% | 68.5 | 3 | 55.0 | 60.5 96% | 66.0 |
| 2.50 | 3 | 56.0 | 61.5 96% | 67.0 | 3 | 57.5 | 63.0 97% | 68.5 | 3 | 55.0 | 60.5 96% | 66.0 |
| 2.38 | 3 | 56.0 | 61.5 96% | 67.0 | 3 | 57.5 | 63.0 97% | 68.5 | 3 | 55.0 | 60.5 96% | 66.0 |
| 2.25 | 3 | 56.0 | 61.5 96% | 67.0 | 3 | 57.5 | 63.0 97% | 68.5 | 3 | 55.0 | 60.5 96% | 66.0 |
| 2.13 | 3 | 55.0 | 61.5 96% | 68.0 | 2 | 60.0 | 66.0 95% | | 2 | 57.5 | 63.5 95% | |
| 2.00 | 3 | 55.0 | 61.5 96% | 68.0 | 2 | 60.0 | 66.0 95% | | 2 | 57.5 | 63.5 95% | |
| 1.88 | 2 | 58.0 | 65.0 96% | | 2 | 59.5 | 66.5 97% | | 2 | 57.0 | 64.0 96% | |
| 1.75 | 2 | 58.0 | 65.0 96% | | 2 | 59.5 | 66.5 97% | | 2 | 57.0 | 64.0 96% | |
| 1.63 | 2 | 57.5 | 65.5 96% | | 2 | 59.0 | 67.0 97% | | 2 | 56.5 | 64.5 96% | |
| 1.50 | 2 | 57.5 | 65.5 96% | | 2 | 59.0 | 67.0 97% | | 2 | 56.5 | 64.5 96% | |
| 1.38 | 2 | 57.0 | 66.0 96% | | 2 | 58.5 | 67.5 97% | | 2 | 56.0 | 65.0 96% | |
| 1.25 | 2 | 56.5 | 66.5 96% | | 2 | 58.0 | 68.0 97% | | 2 | 55.5 | 65.5 96% | |
| 1.13 | 2 | 56.0 | 67.0 96% | | 2 | 57.5 | 68.5 97% | | 2 | 55.0 | 66.0 96% | |
| 1.00 | 1 | 61.5 96% | | | 1 | 63.0 97% | | | 1 | 60.5 96% | | |
| 0.88 | 1 | 61.5 96% | | | 1 | 63.0 97% | | | 1 | 60.5 96% | | |
| 0.75 | 1 | 61.5 96% | | | 1 | 63.0 97% | | | 1 | 60.5 96% | | |
| 0.63 | 1 | 61.5 96% | | | 1 | 63.0 97% | | | 1 | 60.5 96% | | |
| 0.50 | 1 | 61.5 96% | | | 1 | 63.0 97% | | | 1 | 60.5 96% | | |
| 0.38 | 1 | 61.5 96% | | | 1 | 63.0 97% | | | 1 | 60.5 96% | | |
| 0.25 | 1 | 61.5 96% | | | 1 | 63.0 97% | | | 1 | 60.5 96% | | |

In a preferred embodiment noted in Table 13, when the prism is to be limited to 0.66Δ or less for 95% or more of the population served, the methods disclosed herein provide multiple and unique OCD settings for each gender and Diopter power, wherein said OCD 1 is set at 57 mm when combined with OCD 2 set at 61.5 mm when combined with OCD 3 set at 66 mm for unisex reading glasses with +3.000 power Diopter to and including +2.750 power Diopter, and wherein said OCD 1 is set at 56 mm when combined with OCD 2 set at 61.5 mm when combined with OCD 3 set at 67 mm for unisex reading glasses with +2.625 power Diopter to and including +2.25 power Diopter, and wherein said OCD 1 is set at 55 mm when combined with OCD 2 set at 61.5 mm when combined with OCD 3 set at 68 mm for unisex reading glasses with +2.125 power Diopter to and including +2.000 power Diopter, and wherein said OCD 1 is set at 58 mm when combined with OCD 2 set at 65 mm for unisex reading glasses with +1.875 power Diopter to and including +1.750 power Diopter, and wherein said OCD 1 is set at 57.5 mm when combined with OCD 2 set at 65.5 mm for unisex reading glasses with +1.625 power Diopter to and including +1.500 power Diopter, and wherein said OCD 1 is set at 57 mm when combined with OCD 2 set at 66 mm for unisex reading glasses with +1.375 power Diopter, and wherein said OCD 1 is set at 56.5 mm when combined with OCD 2 set at 66.5 mm for unisex reading glasses with +1.250 power Diopter, and wherein said OCD 1 is set at 56 mm when combined with OCD 2 set at 67 mm for unisex reading glasses with +1.125 power Diopter, and wherein said OCD 1 is set at 61.5 mm for unisex reading glasses with +1.000 power Diopter or less.

In another preferred embodiment for male reading glasses, as noted in Table 13, when the prism is to be limited to 0.66Δ or less for 95% or more of the population served, the methods disclosed herein provide multiple and unique OCD settings for each gender and Diopter power, wherein said OCD 1 is set at 58.5 mm when combined with OCD 2 set at 63 mm when combined with OCD 3 set at 67.5 mm for male reading glasses with +3.000 power Diopter to and including +2.750 power Diopter, and wherein said OCD 1 is set at 57.5 mm when combined with OCD 2 set at 63 mm when combined with OCD 3 set at 68.5 mm for male reading glasses with +2.625 power Diopter to and including +2.250 power Diopter, and wherein said OCD 1 is set at 60 mm when combined with OCD 2 set at 66 mm for male reading glasses with +2.125 power Diopter to and including +2.000 power Diopter, and wherein said OCD 1 is set at 59.5 mm when combined with OCD 2 set at 66.5 mm for male reading glasses with +1.875 power Diopter to and including +1.750 power Diopter, and wherein said OCD 1 is set at 59 mm when combined with OCD 2 set at 67 mm for male reading glasses with +1.625 power Diopter to and including +1.500 power Diopter, and wherein said OCD 1 is set at 58.5 mm when combined with OCD 2 set at 67.5 mm for male reading glasses with +1.375 power Diopter, and wherein said OCD 1 is set at 58 mm when combined with OCD 2 set at 68 mm for male reading glasses with +1.250 power Diopter, and wherein said OCD 1 is set at 57.5 mm when combined with OCD 2 set at 68.5 mm for male reading glasses with +1.125 power Diopter, and wherein said OCD 1 is set at 63 mm for male reading glasses with +1.000 power Diopter or less.

In another preferred embodiment for female reading glasses, as noted in Table 13, when the prism is to be limited to 0.66Δ or less for 95% or more of the population served, the methods disclosed herein provide multiple and unique OCD settings for each gender and Diopter power, wherein said OCD 1 is set at 56 mm when combined with OCD 2 set at 60.5 mm when combined with OCD 3 set at 65 mm for female reading glasses with +3.000 power Diopter to and including +2.750 power Diopter, and wherein said OCD 1 is set at 55 mm when combined with OCD 2 set at 60.5 mm when combined with OCD 3 set at 66 mm for female reading glasses with +2.625 power Diopter to and including +2.25 power Diopter, and wherein said OCD 1 is set at 57.5 mm when combined with OCD 2 set at 63.5 mm when combined with OCD 3 set at mm for female reading glasses with +2.125 power Diopter to and including +2.000 power Diopter, and wherein said OCD 0.1 is set at 57 mm when combined with OCD 2 set at 64 mm for female reading glasses with +1.875 power Diopter to and including +1.75 power Diopter, and wherein said OCD 1 is set at 56.5 mm when combined with OCD 2 set at 64.5 mm for female reading glasses with +1.625 power Diopter to and including +1.500 power Diopter, and wherein said OCD 1 is set at 56 mm when combined with OCD 2 set at 65 mm for female reading glasses with +1.375 power Diopter, and wherein said OCD 1 is set at 55.5 mm when combined with OCD 2 set at 65.5 mm for female reading glasses with +1.250 power Diopter, and wherein said OCD 1 is set at 55 mm when combined with OCD 2 set at 66 mm for female reading glasses with +1.125 power Diopter, and wherein said OCD 1 is set at 60.5 mm for female reading glasses with +1.000 power Diopter or less.

TABLE 14 min # of OCD settings that allow max Pop % to experience <.66Δ

| | | unisex | | | | male | | | | female | | |
|---|---|---|---|---|---|---|---|---|---|---|---|---|
| Diopter | OCDs | OCD 1 is set at | when combined with OCD 2 set at | when combined with OCD 3 set at | OCDs | OCD 1 is preferably set at | when combined with OCD 2 set at | when combined with OCD 3 set at | OCDs | OCD 1 is preferably set at | when combined with OCD 2 set at | when combined with OCD 3 set at |
| 3.00 | 3 | 58.5 | 61.5 96% | 67.5 | 3 | 60.5 | 65.0 97% | 69.5 | 3 | 57.5 | 62.0 96% | 66.5 |
| 2.88 | 3 | 58.5 | 61.5 96% | 67.5 | 3 | 60.5 | 65.0 97% | 69.5 | 3 | 57.5 | 62.0 96% | 66.5 |
| 2.75 | 3 | 58.5 | 61.5 96% | 67.5 | 3 | 60.5 | 65.0 97% | 69.5 | 3 | 57.5 | 62.0 96% | 66.5 |
| 2.63 | 3 | 57.5 | 61.5 96% | 68.5 | 3 | 59.5 | 65.0 97% | 70.5 | 3 | 56.5 | 62.0 96% | 67.5 |
| 2.50 | 3 | 57.5 | 61.5 96% | 68.5 | 3 | 59.5 | 65.0 97% | 70.5 | 3 | 56.5 | 62.0 96% | 67.5 |
| 2.38 | 3 | 57.5 | 61.5 96% | 68.5 | 3 | 59.5 | 65.0 97% | 70.5 | 3 | 56.5 | 62.0 96% | 67.5 |

TABLE 14-continued min # of OCD settings that allow max Pop % to experience <.66Δ

| | unisex | | | | male | | | | female | | | |
|---|---|---|---|---|---|---|---|---|---|---|---|---|
| Diopter | OCDs | OCD 1 is set at | when combined with OCD 2 set at | when combined with OCD 3 set at | OCDs | OCD 1 is preferably set at | when combined with OCD 2 set at | when combined with OCD 3 set at | OCDs | OCD 1 is preferably set at | when combined with OCD 2 set at | when combined with OCD 3 set at |
| 2.25 | 3 | 57.5 | 61.5 96% | 68.5 | 3 | 59.5 | 65.0 97% | 70.5 | 3 | 56.5 | 62.0 96% | 67.5 |
| 2.13 | 3 | 56.5 | 61.5 96% | 69.5 | 2 | 62.0 | 68.0 95% | | 2 | 59.0 | 65.0 95% | |
| 2.00 | 3 | 56.5 | 61.5 96% | 69.5 | 2 | 62.0 | 68.0 95% | | 2 | 59.0 | 65.0 95% | |
| 1.88 | 2 | 59.5 | 66.5 96% | | 2 | 61.5 | 68.5 97% | | 2 | 58.5 | 65.5 96% | |
| 1.75 | 2 | 59.5 | 66.5 96% | | 2 | 61.5 | 68.5 97% | | 2 | 58.5 | 65.5 96% | |
| 1.63 | 2 | 59.0 | 67.0 96% | | 2 | 61.0 | 69.0 97% | | 2 | 58.0 | 66.0 96% | |
| 1.50 | 2 | 59.0 | 67.0 96% | | 2 | 61.0 | 69.0 97% | | 2 | 58.0 | 66.0 96% | |
| 1.38 | 2 | 58.5 | 67.5 96% | | 2 | 60.5 | 69.5 97% | | 2 | 57.5 | 66.5 96% | |
| 1.25 | 2 | 58.0 | 68.0 96% | | 2 | 60.0 | 70.0 97% | | 2 | 57.0 | 67.0 96% | |
| 1.13 | 2 | 57.5 | 68.5 96% | | 2 | 59.5 | 70.5 97% | | 2 | 56.5 | 67.5 96% | |
| 1.00 | 1 | 63.0 96% | | | 1 | 65.0 97% | | | 1 | 62.0 96% | | |
| 0.88 | 1 | 63.0 96% | | | 1 | 65.0 97% | | | 1 | 62.0 96% | | |
| 0.75 | 1 | 63.0 96% | | | 1 | 65.0 97% | | | 1 | 62.0 96% | | |
| 0.63 | 1 | 63.0 96% | | | 1 | 65.0 97% | | | 1 | 62.0 96% | | |
| 0.50 | 1 | 63.0 96% | | | 1 | 65.0 97% | | | 1 | 62.0 96% | | |
| 0.38 | 1 | 63.0 96% | | | 1 | 65.0 97% | | | 1 | 62.0 96% | | |
| 0.25 | 1 | 63.0 96% | | | 1 | 65.0 97% | | | 1 | 62.0 96% | | |

In a preferred embodiment noted in Table 14, when the prism is to be limited to 0.66Δ or less for 95% or more of the population served, the methods disclosed herein provide multiple and unique OCD settings for each gender and Diopter power, wherein said OCD 1 is set at 58.5 mm when combined with OCD 2 set at 61.5 mm when combined with OCD 3 set at 67.5 mm for unisex computer glasses with +3.000 power Diopter to and including +2.750 power Diopter, and wherein said OCD 1 is set at 57.5 mm when combined with OCD 2 set at 61.5 mm when combined with OCD 3 set at 68.5 mm for unisex computer glasses with +2.625 power Diopter to and including +2.250 power Diopter, and wherein said OCD 1 is set at 56.5 mm when combined with OCD 2 set at 61.5 mm when combined with OCD 3 set at 69.5 mm for unisex computer glasses with +2.125 power Diopter to and including +2.000 power Diopter, and wherein said OCD 1 is set at 59.5 mm when combined with OCD 2 set at 66.5 mm for unisex computer glasses with +1.875 power Diopter to and including +1.750 power Diopter, and wherein said OCD 1 is set at 59 mm when combined with OCD 2 set at 67 mm for unisex computer glasses with +1.625 power Diopter to and including +1.500 power Diopter, and wherein said OCD 1 is set at 58.5 mm when combined with OCD 2 set at 67.5 mm for unisex computer glasses with +1.375 power Diopter, and wherein said OCD 1 is set at 58 mm when combined with OCD 2 set at 68 mm for unisex computer glasses with +1.250 power Diopter, and wherein said OCD 1 is set at 57.5 mm when combined with OCD 2 set at 68.5 mm for unisex computer glasses with +1.125 power Diopter, and wherein said OCD 1 is set at 63 mm for unisex computer glasses with +1.000 power Diopter or less.

In a preferred embodiment for male computer glasses, as noted in Table 14, when the prism is to be limited to 0.66Δ or less for 95% or more of the population served, the methods disclosed herein provide multiple and unique OCD settings for each gender and Diopter power, wherein said OCD 1 is set at 60.5 mm when combined with OCD 2 set at 65 mm when combined with OCD 3 set at 69.5 mm for male computer glasses with +3.000 power Diopter to and including +2.750 power Diopter, and wherein said OCD 1 is set at 59.5 mm when combined with OCD 2 set at 65 mm when combined with OCD 3 set at 70.5 mm for male computer glasses with +2.625 power Diopter to and including +2.250 power Diopter, and wherein said OCD 1 is set at 62 mm when combined with OCD 2 set at 68 mm for male computer glasses with +2.125 power Diopter to and including +2.000 power Diopter, and wherein said OCD 1 is set at 61.5 mm when combined with OCD 2 set at 68.5 mm for male computer glasses with +1.875 power Diopter to and including +1.750 power Diopter, and wherein said OCD 1 is set at 61 mm when combined with OCD 2 set at 69 mm for male computer glasses with +1.625 power Diopter to and including +1.500 power Diopter, and wherein said OCD 1 is set at 60.5 mm when combined with OCD 2 set at 69.5 mm for male computer glasses with +1.375 power Diopter, and wherein said OCD 1 is set at 60 mm when combined with OCD 2 set at 70 mm for male computer glasses with +1.250 power Diopter, and wherein said OCD 1 is set at 59.5 mm when combined with OCD 2 set at 70.5 mm for male computer glasses with +1.125 power Diopter, and wherein said OCD 1 is set at 65 mm for male computer glasses with +1.000 power Diopter or less.

In a preferred embodiment for female computer glasses, as noted in Table 14, when the prism is to be limited to 0.66Δ or less for 95% or more of the population served, the methods disclosed herein provide multiple and unique OCD settings for each gender and Diopter power, wherein said OCD 1 is set at 57.5 mm when combined with OCD 2 set at 62 mm when combined with OCD 3 set at 66.5 mm for female computer glasses with +3.000 power Diopter to and including +2.750 power Diopter, and wherein said OCD 1 is set at 56.5 mm when combined with OCD 2 set at 62 mm when combined with OCD 3 set at 67.5 mm for female computer glasses with +2.625 power Diopter to and including +2.250 power Diopter, and wherein said OCD 1 is set at 59 mm when combined with OCD 2 set at 65 mm for female computer glasses with +2.125 power Diopter to and including +2.000 power Diopter, and wherein said OCD 1 is set at 58.5 mm when combined with OCD 2 set at 65.5 mm for female computer glasses with +1.875 power Diopter to and including +1.750 power Diopter, and wherein said OCD 1 is set at 58 mm when combined with OCD 2 set at 66 mm for female computer glasses with +1.625 power Diopter to and including +1.500 power Diopter, and wherein said OCD 1 is set at 57.5 mm when combined with OCD 2 set at 66.5 mm for female computer glasses with +1.375 power Diopter, and wherein said OCD 1 is set at 57 mm when combined with OCD 2 set at 67 mm for female computer glasses with +1.250 power Diopter, and wherein said OCD 1 is set at 56.5 mm when combined with OCD 2 set at 67.5 mm for female computer glasses with +1.125 power Diopter, and wherein said OCD 1 is set at 62 mm for female computer glasses with +1.000 power Diopter or less.

In any of the embodiments, the invention provides for Diopter steps that will limit expansion of inventory requirements. For example, the Diopter steps of +2.875 combined with +2.375 combined with +1.875 combined with +1.375 will substantially match the conventional or typical range of +3.00 to +1.25 Diopters, yet require with only four Diopter powers offered versus the conventional number of eight, thus halving the Diopter inventory requirement. In a preferred embodiment, as noted in Table 15, when the prism is to be limited to 0.66Δ or less for 80% or more of the population and the inventory must be limited, the methods disclosed herein provide unique settings by gender and Diopter power for 40 cm viewing distance and considering all races in the US, wherein said OCD 1 is set at 59.5 mm when combined with OCD 2 set at 63.5 mm for unisex reading glasses with +2.875 power Diopter, and wherein said OCD 1 is set at 59 mm when combined with OCD 2 set at 64 mm for unisex reading glasses with +2.375 power Diopter, and wherein said OCD 1 is set at 58 mm when combined with OCD 2 set at 65 mm for unisex reading glasses with +1.875 power Diopter, and wherein a single OCD set at 61.5 mm for unisex reading glasses with +1.375 power Diopter or less, and wherein said OCD 1 is set at 61 mm when combined with OCD 2 set at 65 mm for male style reading glasses with +2.875 power Diopter, and wherein said OCD 1 is set at 60.5 mm when combined with OCD 2 set at 65.5 mm for male style reading glasses with +2.375 power Diopter, and wherein said OCD 1 is set at 59.5 mm when combined with OCD 2 set at 66.5 mm for male style reading glasses with +1.875 power Diopter, and wherein said OCD 1 is set at 63 mm for male style reading glasses with +1.375 power Diopter or less, and wherein said OCD 1 is set at 58.5 mm when combined with OCD 2 set at 62.5 mm for female style reading glasses with +2.875 power Diopter, and wherein said OCD 1 is set at 58 mm when combined with OCD 2 set at 63 mm for female style reading glasses with +2.375 power Diopter, and wherein said OCD 1 is set at 57 mm when combined with OCD 2 set at 64 mm for female style reading glasses with +1.875 power Diopter, and wherein said OCD 1 is set at 60.5 mm for female style reading glasses with +1.375 power Diopter or less.

TABLE 15 min # of OCD settings that allow max Pop % to experience <.66Δ

| | unisex | | | male | | | female | |
|---|---|---|---|---|---|---|---|---|
| Diopter | OCDs | OCD 1 is set at | when combined with OCD 2 set at | OCDs | OCD 1 is preferably set at | when combined with OCD 2 set at | OCDs | OCD 1 is preferably set at | when combined with OCD 2 set at |
| 2.88 | 2 | 59.5 | 63.5 80% | 2 | 61.0 | 65.0 82% | 2 | 58.5 | 62.5 81% |
| 2.38 | 2 | 59.0 | 64.0 89% | 2 | 60.5 | 65.5 90% | 2 | 58.0 | 63.0 89% |
| 1.88 | 2 | 58.0 | 65.0 96% | 2 | 59.5 | 66.5 97% | 2 | 57.0 | 64.0 96% |
| 1.38 | 1 | 61.5 | 85% | 1 | 63.0 | 87% | 1 | 60.5 | 85% |
| 0.88 | 1 | 61.5 | 98% | 1 | 63.0 | 97% | 1 | 60.5 | 96% |
| 0.38 | 1 | 61.5 | 100% | 1 | 63.0 | 97% | 1 | 60.5 | 96% |

TABLE 16 min # of OCD settings that allow max Pop % to experience <.66Δ

| | unisex | | | male | | | female | | |
|---|---|---|---|---|---|---|---|---|---|
| Diopter | OCDs | OCD 1 is set at | when combined with OCD 2 set at | OCDs | OCD 1 is preferably set at | when combined with OCD 2 set at | OCDs | OCD 1 is preferably set at | when combined with OCD 2 set at |
| 2.63 | 2 | 59.0 | 64.0 89% | 2 | 60.5 | 65.5 90% | 2 | 58.0 | 63.0 89% |
| 2.13 | 2 | 58.5 | 64.5 94% | 2 | 60.0 | 66.0 95% | 2 | 57.5 | 63.5 95% |
| 1.63 | 1 | 61.5 80% | | 1 | 63.0 82% | | 1 | 60.5 81% | |
| 1.13 | 1 | 61.5 92% | | 1 | 63.0 93% | | 1 | 60.5 92% | |
| 0.63 | 1 | 61.5 100% | | 1 | 63.0 97% | | 1 | 60.5 96% | |

In a preferred embodiment, as noted in Table 16, when the prism is to be limited to 0.66Δ or less for 80% or more of the population and the inventory must be limited, the methods disclosed herein provide unique settings by gender and Diopter power for 40 cm viewing distance and considering all races in the US, wherein said OCD 1 is set at 59 mm when combined with OCD 2 set at 64 mm for unisex reading glasses with +2.625 power Diopter, and wherein said OCD 1 is set at 58.5 mm when combined with OCD 2 set at 64.5 mm for unisex reading glasses with +2.125 power Diopter, and wherein said OCD 1 is set at 61.5 mm for unisex reading glasses with +1.625 power Diopter or less, and wherein said OCD 1 is set at 60.5 mm when combined with OCD 2 set at 65.5 mm for male style reading glasses with +2.625 power Diopter, and wherein said OCD 1 is set at 60 mm when combined with OCD 2 set at 66 mm for male style reading glasses with +2.125 power Diopter, and wherein said OCD 1 is set at 63 mm for male style reading glasses with +1.625 power Diopter or less, and wherein said OCD 1 is set at 58 mm when combined with OCD 2 set at 63 mm for female style reading glasses with +2.625 power Diopter, and wherein said OCD 1 is set at 57.5 mm when combined with OCD 2 set at 63.5 mm for female style reading glasses with +2.125 power Diopter, and wherein said OCD 1 is set at 60.5 mm for female style reading glasses with +1.625 power Diopter or less.

In a preferred embodiment, as noted in Table 17, for computer glasses to be utilized for intermediate viewing distance, such as a computer at 76.2 cm from the eye, and the prism is to be limited to 0.66Δ or less for 80% or more of the population served, the methods disclosed herein provide multiple and unique OCD settings by gender and Diopter power considering all races in the US, wherein said OCD 1 is set at 61 mm when combined with OCD 2 set at 65 mm for unisex computer glasses with +2.875 power Diopter, and wherein said OCD 1 is set at 60.5 mm when combined with OCD 2 set at 65.5 mm for unisex computer glasses with +2.375 power Diopter, and wherein said OCD 1 is set at 59.5 mm when combined with OCD 2 set at 66.5 mm for unisex computer glasses with +1.875 power Diopter, and wherein a single OCD 1 is set at 63 mm for unisex computer glasses with +1.375 power Diopter or less, and wherein said OCD 1 is set at 63 mm when combined with OCD 2 set at 67 mm for male computer glasses with +2.875 power Diopter, and wherein said OCD 1 is set at 62.5 mm when combined with OCD 2 set at 67.5 mm for male computer glasses with +2.375 power Diopter, and wherein said OCD 1 is set at 61.5 mm when combined with OCD 2 set at 68.5 mm for male computer glasses with +1.875 power Diopter, and wherein a single OCD 1 is set at 65 mm for male computer glasses with +1.375 power Diopter or less, and wherein said OCD 1 is set at 60 mm

TABLE 17 min # of OCD settings that allow max Pop % to experience <.66Δ

| | unisex | | | | male | | | female | | |
|---|---|---|---|---|---|---|---|---|---|---|
| Diopter | OCDs | OCD 1 is set at | when combined with OCD 2 set at | OCD 3 set at | OCDs | OCD 1 is preferably set at | when combined with OCD 2 set at | OCDs | OCD 1 is preferably set at | when combined with OCD 2 set at |
| 2.88 | 2 | 61.0 | 65.0 80% | | 2 | 63.0 82% | 67.0 | 2 | 60.0 81% | 64.0 |
| 2.38 | 2 | 60.5 | 65.5 89% | | 2 | 62.5 90% | 67.5 | 2 | 59.5 89% | 64.5 |
| 1.88 | 2 | 59.5 | 66.5 96% | | 2 | 61.5 97% | 68.5 | 2 | 58.5 96% | 65.5 |
| 1.38 | 1 | 63.0 85% | | | 1 | 65.0 87% | | 1 | 62.0 85% | |
| 0.88 | 1 | 63.0 98% | | | 1 | 65.0 97% | | 1 | 62.0 96% | |
| 0.38 | 1 | 63.0 100% | | | 1 | 65.0 97% | | 1 | 62.0 96% | | when combined with OCD 2 set at 64 mm for female computer glasses with +2.875 power Diopter, and wherein said OCD 1 is set at 59.5 mm when combined with OCD 2 set at 64.5 mm for female computer glasses with +2.375 power Diopter, and wherein said OCD 1 is set at 58.5 mm when combined with OCD 2 set at 65.5 mm for female computer glasses with +1.875 power Diopter, and wherein a single OCD 1 is set at 62 mm for female computer glasses with +1.375 power Diopter or less.

TABLE 18 min # of OCD settings that allow max Pop % to experience <.66Δ

| | unisex | | | male | | | female | | |
|---|---|---|---|---|---|---|---|---|---|
| Diopter | OCDs | OCD 1 is set at | when combined with OCD 2 set at | OCD 3 set at | OCDs | OCD 1 is preferably set at | when combined with OCD 2 set at | OCDs | OCD 1 is preferably set at | when combined with OCD 2 set at |
| 2.63 | 2 | 60.5 | 65.5 89% | | 2 | 62.5 | 67.5 90% | 2 | 59.5 | 64.5 89% |
| 2.13 | 2 | 60.0 | 66.0 94% | | 2 | 62.0 | 68.0 95% | 2 | 59.0 | 65.0 95% |
| 1.63 | 1 | 63.0 | 80% | | 1 | 65.0 | 82% | 1 | 62.0 | 81% |
| 1.13 | 1 | 63.0 | 92% | | 1 | 65.0 | 93% | 1 | 62.0 | 92% |
| 0.63 | 1 | 63.0 | 100% | | 1 | 65.0 | 97% | 1 | 62.0 | 96% |

In a preferred embodiment, as noted in Table 18, for computer glasses to be utilized for intermediate viewing distance, such as a computer at 76.2 cm from the eye, and the prism is to be limited to 0.66Δ or less for 80% or more of the population served, the methods disclosed herein provide multiple and unique OCD settings by gender and Diopter power considering all races in the US, wherein said OCD 1 is set at 60.5 mm when combined with OCD 2 set at 65.5 mm for unisex computer glasses with +2.625 power Diopter, and wherein said OCD 1 is set at 60 mm when combined with OCD 2 set at 66 mm for unisex computer glasses with +2.125 power Diopter, and wherein said OCD 1 is set at 63 mm for unisex computer glasses with +1.625 power Diopter or less, and wherein said OCD 1 is set at 62.5 mm when combined with OCD 2 set at 67.5 mm for male computer glasses with +2.625 power Diopter, and wherein said OCD 1 is set at 62 mm when combined with OCD 2 set at 68 mm for male computer glasses with +2.125 power Diopter, and wherein said OCD 1 is set 65 mm for male computer glasses with +1.625 power Diopter or less, and wherein said OCD 1 is set at 59.5 mm when combined with OCD 2 set at 64.5 mm for female computer glasses with +2.625 power Diopter, and wherein said OCD 1 is set at 59 mm when combined with OCD 2 set at 65 mm for female computer glasses with +2.125 power Diopter, and wherein said OCD 1 is set at 62 mm for female computer glasses with +1.625 power Diopter or less.

Thus, in one embodiment, the invention provides a plurality of pairs of eyeglasses, comprising at most three OCDs, one for all Diopters of each gender: male, female or unisex reading or computer glasses that keep prism below 0.66Δ for an average 68% percent of the population, a higher percentage than was previously possible with conventional eyeglasses.

In another embodiment, the invention provides a plurality of pairs of eyeglasses, comprising two OCDs per gender, wherein two OCDs are configured to keep prism below 0.66Δs for at least 80% of the US adult human population at any Diopter power greater than +1.75 Diopter, and wherein a single OCD for each gender (male, female and unisex) is configured to keep prism below 0.66Δs for at least 80% of the US adult human population at any Diopter power greater than +1.75 Diopter, and wherein a single OCD for each gender (male, female and unisex) is configured to keep prism below 0.66Δs for at least 80% of the US adult human population at any Diopter power equal to or less than +1.625.

In another embodiment, the invention provides a plurality of pairs of eyeglasses, comprising: at most three optical center distances (OCDs) per gender wherein: the OCDs are configured to limit the unwanted prism to no more than 0.66Δs for at least 95% of the US adult human population at any Diopter power higher than or equal to +2.25 for male or female style glasses, and for Diopter powers greater than or equal to +2.00 for unisex style reading or computer glasses, and wherein two OCDs are configured per gender for male, female and unisex style reading glasses to keep prism below 0.66Δs for at least 95% of the US adult human population at any Diopter power equal to or between +2.125 and +1.125 for men and women, and for Diopter powers equal to or between two +1.875 and +1.125 for unisex style reading glasses, and wherein a single OCD for each gender (male, female and unisex) is configured to keep prism below 0.66Δs for at least 95% of the US adult human population at any Diopter power equal to or less than +1.000.

In yet another embodiment, the invention provides a plurality of pairs of eyeglasses, comprising at least one but not more than two OCDs per gender and Diopter power, wherein the OCDs are configured to keep prism at a minimum for the largest percent of the selected population and a larger percentage than could occur with a single OCD setting, or any conventional settings for eyeglasses, all of which failed to consider race, gender, reading distance and Diopter power.

In another embodiment of the invention, the methods described herein may be applied advantageously to the design, manufacture, and use of other optical devices, including sunglasses, safety glasses, and binocular optical instruments such as stereoscopes, binoculars, and microscopes.

IV. Conclusion

Thus, what has been described is eyeglasses, including reading, computer safety, and sunglasses, and a display therefor, where the eyeglasses have improved OCD settings. A first pair of eyeglasses has a different OCD than a second pair of eyeglasses and the lenses of the eyeglasses are uncovered by any layer that is releasably attached to the two static lenses of any of the plurality of pairs of eyeglasses. The eyeglasses may have an OCD setting specific to each gender (male, female and unisex style glasses) and two or three OCDs for each Diopter of each gender to accommodate users with different PDs, thus minimizing the aberrations and prism and thereby increasing the comfort and wearability of the eyeglasses.

In addition to eyeglasses with more than one OCD, eyeglasses with a single OCD for each gender or combined genders have been described wherein the OCD of such glasses is based upon the population mean weighted NPD for the selected population and intended reading distance, and wherein the single OCD is calculated based upon race, gender, NPD, and viewing distance and where the single OCD significantly limits the prism and resulting eyestrain as compared with conventional eyeglasses settings.

What has been described is eyeglasses, comprising at most three OCDs per Diopter per gender, or two OCDs per Diopter per gender, or one OCD per Diopter per gender, wherein the OCDs are configured to keep unwanted prism levels below 0.66Δ for the greatest number of people, or in various embodiments for at least 68%, 80% or 95% of the NPDs occurring in the adult human population at any Diopter power.

Lastly, what has been described is eyeglasses comprising at most two OCDs, wherein the OCDs are configured to lessen the induced prismatic power compared to a single OCD offering.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents and non-patent documents discussed above are hereby incorporated by reference into the Detailed Description of the Invention.

What is claimed is:

1. A method for providing a plurality of pairs of reading or computer glasses comprising the steps of: providing at least a first pair of eyeglasses that has a first lens and a second lens, wherein the first lens and second lens have a first optical center and a second optical center, respectively, that are spaced at a first optical center distance (OCD); providing at least a second pair of eyeglasses that has a third lens and a fourth lens, wherein the third lens and fourth lens have a third optical center and a fourth optical center, respectively, that are spaced at a second optical center distance (OCD), thereby providing at least two optical center distances (OCDs); and providing said glasses for sale on an over the counter (OTC) retail non-prescription basis, wherein the at least two OCDs are based upon a specific viewing distance or range of viewing distances, and further based upon a prevalence of near pupillary distances (NPDs) and their respective weighted means and standard deviations among a specified gender and race or a specified mix of genders and races of a population.

2. The method of claim 1, wherein the first and second pairs of eyeglasses are configured for a reading distance for all adults over age 40 of all races, and the first OCD is determined to be 63.0 mm for men, the second OCD is determined to be 60.5 mm for women, and, when gender is not specified or unisex, a third OCD is determined to be 61.5 mm.

3. The method of claim 1, wherein the first and second pairs of eyeglasses are configured for computer viewing for all adults over age 40 of all races, and the first OCD is determined to be 65.0 mm for men, the second OCD is determined to be 62.0 mm for women, and, when gender is not specified or unisex, a third OCD is determined to be 63.0 mm.

4. The method of claim 1, each of the first and second pairs of eyeglasses having a Diopter power, wherein multiple OCDs are calculated and the least number are produced that are not more than one OCD per Diopter power and that reduce prism to 0.66 prism Diopters or less for an average 68% or higher of all NPDs in the specified population.

5. The method of claim 1, further comprising the steps of calculating a plurality of OCDs based on reducing prism for a specific portion of NPDs occurring in the adult human population, and producing a least number of OCDs calculated on the basis of reducing the prism for the specific portion of the NPDs occurring in the adult human population.

6. The method of claim 1, wherein the OCDs are calculated and produced to minimize a number of lenses required and NPDs occurring in one of the adult human population or a portion of the adult human population that will encounter more than 0.66Δs.

7. The method of claim 1, wherein a least number of OCDs are calculated and produced to maximize a number of NPDs occurring in one of the adult human population or a portion of the adult human population that will encounter less than 0.66Δs.

8. The method of claim 1, wherein the OCDs are calculated and produced to minimize a required number of OCDs and a percentage of the NPDs occurring in one of the adult human population or percentage of a portion of the adult human population that on average will experience more than 0.66Δs.

9. The method of claim 1, wherein the at least two OCDs are determined for each of a male gender, a female gender, and a unisex gender, and wherein the OCDs are further based upon a predetermined Diopter power and a number of OCDs being provided per gender and per Diopter, and wherein ranges of NPDs that will benefit from reduced prism for each of the OCDs are determined based upon standard deviations of an NPD distribution using a standard normal cumulative distribution function and prism calculations, wherein the OCDs are selected to reduce the prism for a greater segment of near pupillary distances (NPDs) occurring in an adult human population at the given Diopter power, said ranges varying by Diopter power; and the method further includes the step of providing said reading glasses with one or more OCDs for each Diopter power offered for sale on an over the counter (OTC) retail non-prescription basis.

10. The method of claim 9, wherein a least number of OCDs are calculated and produced to maximize a percentage or number of standard deviations of the NPDs occurring in the adult human population such that a chosen percentage or portion or number of standard deviations of the NPDs occurring in the adult human population on average will experience less than 0.66Δs.

11. The method of claim 10, wherein a least number of OCDs are calculated and produced to maximize a percentage of NPDs occurring in the adult human population such that at least 95% percent of a portion of the NPDs occurring in the adult human population that lie within two standard deviations of a mean NPD on average will experience less than 0.66Δs.

12. The method of claim 11, wherein the least number of OCDs that limit the prism to 0.66Δ or less for 80% or more of the NPDs in the population comprises a single OCD required for each of a male gender, a female gender, and a unisex gender eyeglass for each Diopter power less than or equal to +1.625, and wherein at least two OCDs are required per gender for each Diopter power equal to or greater than +1.75, and wherein race is a factor in the OCD calculation.

13. The method of claim 12, wherein the first and second pairs of eyeglasses are configured for a reading distance for all races, and wherein the first and second pairs of eyeglasses are configured for unisex gender, and wherein said first OCD is equal to 59.5 mm and said second OCD is equal to 63.5 mm for reading glasses having a +3.00 to +2.75 Diopter power, and wherein said first OCD is equal to 59 mm and said second OCD is equal to 64 mm for reading glasses having a +2.625 to +2.25 Diopter power, and wherein said first OCD is equal to 58.5 mm and said second OCD is equal to 64.5 mm for reading glasses having a +2.125 to +2.000 Diopter power, and wherein said first OCD is equal to 58 mm and said second OCD is 65 mm for reading glasses having a +1.875 to +1.750 Diopter power, and wherein for Diopter powers equal to or less than +1.625, both of said first and second OCDs are equal to 61.5 mm.

14. The method of claim 12, wherein the first and second pairs of eyeglasses are configured for a reading distance for all races and wherein the first and second pairs of eyeglasses are further configured for male gender, and wherein said first OCD is equal to 61 mm and said second OCD is equal to 65 mm for reading glasses having a +3.00 to +2.75 Diopter power, and wherein said first OCD is equal to 60.5 mm and said second OCD is equal to 65.5 mm for reading glasses having a +2.625 to +2.25 Diopter power, and wherein said first OCD is equal to 60 mm and second OCD is equal to 66 mm for reading glasses having a +2.125 to +2.00 Diopter power, and wherein said first OCD is equal to 59.5 mm and second OCD is equal to 66.5 mm for reading glasses having a +1.875 to +1.75 Diopter power, and wherein for Diopter powers equal to or less than +1.625, both of said first and second OCDs are equal to 63 mm.

15. The method of claim 12, wherein the first and second pairs of eyeglasses are configured for a reading distance for all races, and wherein the first and second pairs of eyeglasses are further configured for female gender, and wherein said first OCD is equal to 58:5 mm and said second OCD is equal to 62.5 mm for reading glasses having a +3.00 to +2.75 Diopter power, and wherein said first OCD is equal to 58 mm and said second OCD is equal to 63 mm for reading glasses having a +2.625 to +2.25 Diopter power, and wherein said first OCD is equal to 57.5 mm and said second OCD is equal to 63.5 mm for reading glasses having a +2.125 to +2.00 Diopter power, and wherein said first OCD is equal to 57 mm and said second OCD is equal to 64 mm for reading glasses having a +1.875 to +1.75 Diopter power, and wherein for Diopter powers equal to or less than +1.625, both of said first and second OCDs are equal to 60.5 mm.

16. The method of claim 12, wherein the first and second pairs of eyeglasses are configured for a computer viewing distance for all races, and wherein the first and second eyeglasses are further configured for unisex gender, and wherein said first OCD is equal to 61 mm and said second OCD is equal to 65 mm for glasses having a +3.00 to +2.75 Diopter power, and wherein said first OCD is equal to 60.5 mm and said second OCD is equal to 65.5 mm for glasses having a +2.625 to +2.25 Diopter power, wherein said first OCD is equal to 60 mm and said second OCD is equal to 66 mm for glasses having a +2.125 to +2.00 Diopter power, and wherein said first OCD is equal to 59.5 mm and said second OCD is equal to 66.5 mm for glasses having a +1.875 to +1.75 Diopter power, and wherein for Diopter powers equal to or less than +1.625, both of said first and second OCDs are equal to 63 mm.

17. The method of claim 12 wherein the first and second eyeglasses are configured for a computer viewing distance for all races, and wherein the first and second pairs of eyeglasses are further configured for male gender, and wherein said first OCD is equal to 63 mm and said second OCD is equal to 67 mm for glasses having a +3.00 to +2.75 Diopter power, and wherein said first OCD is equal to 62.5 mm and said second OCD is equal to 67.5 mm for glasses having a +2.625 to +2.25 Diopter power, and wherein said first OCD is equal to 62 mm and said second OCD is equal to 68 mm for glasses having a +2.125 to +2.00 Diopter power, and wherein said first OCD is equal to 61.5 mm and said second OCD is equal to 68.5 mm for glasses having a +1.875 to +1.75 Diopter power, and wherein for Diopter powers equal to or less than +1.625, both of said first and second OCDs are equal to 65 mm.

18. The method of claim 12, wherein the first and second pairs of eyeglasses are configured for a computer viewing distance for all races, and wherein the first and second pairs of eyeglasses are further configured for female gender, and wherein said first OCD is equal to 60 mm and said second OCD is equal to 64 mm for glasses having a +3.00 to +2.75 Diopter power, and wherein said first OCD is equal to 59.5 mm and said second OCD is equal to 64.5 mm for glasses having a +2.625 to +2.25 power, and wherein said first OCD is equal to 59 mm and said second OCD is equal to 65 mm for glasses having a +2.125 to +2.00 Diopter power, and wherein said first OCD is equal to 58.5 mm and said second OCD is equal to 65.5 mm for glasses having a +1.875 to +1.75 Diopter power, and wherein for Diopter powers equal to or less than +1.625, both of said first and second OCDs are equal to 62 mm.

19. The method of claim 11, wherein the least number of OCDs is a single OCD required for each of a male gender, a female gender, and a unisex gender eyeglass for all Diopter powers less than or equal to or less than +1.00, and wherein at least two OCDs are required per gender for Diopter powers equal to or between +1.125 and +1.875 Diopter powers for unisex gender, and equal to or between +1.125 and +2.125 for each of the male and female genders, and wherein at least three OCDs are required per gender for Diopter powers equal to or greater than +2.00 for unisex gender and equal to or greater than +2.25 for male or female genders, and wherein race is a factor in the OCD calculation.

20. The method of claim 19, wherein the first and second pairs of eyeglasses are configured for a reading distance for all races, and wherein the first and second pairs of eyeglasses are further configured for unisex gender, and wherein said first OCD is equal to 57 mm and said second OCD is equal to 61.5 mm and said third OCD is equal to 66 mm for reading glasses having a +3.00 to +2.75 Diopter power, and wherein said first OCD is equal to 56 mm and said second OCD is equal to 61.5 mm and said third OCD 3 is equal to 67 mm for reading glasses having a +2.625 to +2.25 Diopter power, and wherein said first OCD is equal to 55 mm and said second OCD is equal to 61.5 mm and said third OCD is equal to 68 mm for reading glasses having a +2.125 or +2.00 Diopter power, and wherein said first OCD is equal to 58 mm and said second OCD is equal to 65 mm for reading glasses having a +1.875 or +1.75 Diopter power, and wherein said first OCD is equal to 57.5 mm and said second OCD is equal to 65.5 mm for reading glasses having a +1.625 or +1.50 Diopter power, and wherein said first OCD is equal to 57 mm and said second OCD is equal to 66 mm for reading glasses having a +1.375 Diopter power, and wherein said first OCD is equal to 56.5 mm and said second OCD is equal to 66.5 mm for reading glasses having a +1.25 Diopter power, and wherein said first OCD is equal to 56 mm and said second OCD is equal to 67 mm for reading glasses having a +1.125 Diopter power, and wherein said single OCD is equal to 61.5 mm for reading glasses having a +1.00 Diopter power or less.

21. The method of claim 19, wherein the first and second pairs of eyeglasses are configured for a reading distance for all races, and wherein the first and second pairs of eyeglasses are further configured for male gender, and wherein said first OCD is equal to 58.5 mm and said second OCD is equal to 63.0 mm and said third OCD is equal to 67.5 mm for reading glasses having a +3.00 to +2.75 Diopter power, and wherein said first OCD is equal to 57.5 mm and said second OCD is equal to 63 mm and said third OCD is equal to 68.5 mm for reading glasses having a +2.625 to +2.25 Diopter power, and wherein said first OCD is equal to 60 mm and said second OCD is equal to 66 mm for reading glasses having a +2.125 or +2.00 Diopter power, and wherein first OCD is equal to 59.5 mm and said second OCD is equal to 66.5 mm for reading glasses having a +1.875 or +1.75 Diopter power, and wherein said first OCD is equal to 59 mm and said second OCD is equal to 67 mm for reading glasses having a +1.625 or +1.50 Diopter power, and wherein said first OCD is equal to 58.5 mm and said second OCD is equal to 67.5 mm for reading glasses having a +1.375 Diopter power, and wherein said first OCD is equal to 58 mm and said second OCD is equal to 68 mm for reading glasses having a +1.25 Diopter power, and wherein said first OCD is equal to 57.5 mm and said second OCD is equal to 68.5 mm for reading glasses having a +1.125 Diopter power, and wherein said single OCD is equal to 63 mm for reading glasses having a +1.00 Diopter power or less.

22. The method of claim 19, wherein the first and second pairs of eyeglasses are configured for a reading distance for all races, and wherein the first and second pairs of eyeglasses are further configured for female gender, and wherein said first OCD is equal to 56 mm and said second OCD is equal to 60.5 mm and said third OCD is equal to 65 mm for reading glasses having a +3.00 to +2.75 Diopter power, and wherein said first OCD is equal to 55 mm and said second OCD is equal to 60.5 mm and said third OCD is equal to 66 mm for reading glasses having a +2.625 to +2.25 Diopter power, and wherein said first OCD is equal to 57.5 mm and said second OCD is equal to 63.5 mm for reading glasses having a +2.125 or +2.00 Diopter power, and wherein said first OCD is equal to 57 mm and said second OCD is equal to 64 mm for reading glasses having a +1.875 or +1.75 Diopter power, and wherein said first OCD is equal to 56.5 mm and said second OCD is equal to 64.5 mm for reading glasses having a +1.625 to +1.50 Diopter power, and wherein said first OCD is equal to 56 mm and said second OCD is equal to 65 mm for reading glasses having a +1.375 Diopter power, and wherein said first OCD is equal to 55.5 mm and said second OCD is equal to 65.5 mm for reading glasses having a +1.25 Diopter power, and wherein said first OCD is equal to 55 mm and said second OCD is equal to 66 mm for reading glasses having a +1.125 Diopter power, and wherein said single OCD is equal to 60.5 mm for reading glasses having a +1.00 Diopter power or less.

23. The method of claim 19, wherein the first and second pairs of eyeglasses are configured for a computer viewing distance for all races, and wherein the first and second pairs of eyeglasses are further configured for unisex gender, and wherein said first OCD is equal to 58.5 mm and said second OCD is equal to 61.5 mm and said third OCD is equal to 67.5 mm for glasses having a +3.00 to +2.75 Diopter power, and wherein said first OCD is equal to 57.5 mm and said second OCD is equal to 61.5 mm and said third OCD is equal to 68.5 mm for glasses having a +2.625 to +2.25 Diopter power, and wherein said first OCD is equal to 56.5 mm and said second OCD is equal to 61.5 mm and said third OCD is equal to 69.5 mm for glasses having a +2.125 or +2.00 Diopter power, and wherein said first OCD is equal to 59.5 mm and said second OCD is equal to 66.5 mm for glasses having a +1.875 or +1.75 Diopter power, and wherein said first OCD is equal to 59 mm and said second OCD is equal to 67 mm for glasses having a +1.625 or +1.50 Diopter power, and wherein said first OCD is equal to 58.5 mm and said second OCD is equal to 67.5 mm for glasses having a +1.375 Diopter power, and wherein said first OCD is equal to 58 mm and said second OCD is equal to 68 mm for glasses having a +1.25 Diopter power, and wherein said first OCD is equal to 57.5 mm and said second OCD is equal to 68.5 mm for glasses having a +1.125 Diopter power, and wherein said single OCD is equal to 63 mm for glasses having a +1.00 Diopter power or less.

24. The method of claim 19, wherein the first and second pairs of eyeglasses are configured for a computer viewing distance for all races, and wherein the first and second pairs of eyeglasses are further configured for male gender, and wherein said first OCD is equal to 60.5 mm and said second OCD is equal to 65 mm and said third OCD is equal to 69.5 mm for glasses having a +3.00 to +2.75 Diopter power, and wherein said first OCD is equal to 59.5 mm and said second OCD is equal to 65 mm and said third OCD is equal to 70.5 mm for glasses having a +2.625 to +2.25 Diopter power, and wherein said first OCD is equal to 62 mm and said second OCD is equal to 68 mm for glasses having a +2.125 or +2.00 Diopter power, and wherein said first OCD is equal to 61.5 mm and said second OCD is equal to 68.5 mm for glasses having a +1.875 or +1.75 Diopter power, and wherein said first OCD is equal to 61 mm and said second OCD is equal to 69 mm for glasses having a +1.625 or +1.50 Diopter power, and wherein said first OCD is equal to 60.5 mm and said second OCD is equal to 69.5 mm for glasses having a +1.375 Diopter power, and wherein said first OCD is equal to 60 mm and said second OCD is equal to 70 mm for glasses having a +1.25 Diopter power, and wherein said first OCD is equal to 59.5 mm and said second OCD is equal to 70.5 mm for glasses having a +1.125 Diopter power, and wherein said single OCD is equal to 65 mm for glasses having a +1.00 Diopter power or less.

25. The method of claim 19, wherein the first and second pairs of eyeglasses are configured for a computer viewing distance for all races, and wherein the first and second pairs of eyeglasses are further configured for female gender, and wherein said first OCD is equal to 57.5 mm and said second OCD is equal to 62 mm and said third OCD is equal to 66.5 mm for glasses having a +3.00 to +2.75 Diopter power, and wherein said first OCD is equal to 56.5 mm and said second OCD is equal to 62 mm and said third OCD is equal to 67.5 mm for glasses having a +2.625 to +2.25 Diopter power, and wherein said first OCD is equal to 59 mm and said second OCD is equal to 65 mm for glasses having a +2.125 or +2.00 Diopter power, and wherein said first OCD is equal to 58.5 mm and said second OCD is equal to 65.5 mm for glasses having a +1.875 or +1.75 Diopter power, and wherein said first OCD is equal to 58 mm and said second OCD is equal to 66 mm for glasses having a +1.625 or +1.50 Diopter power, and wherein said first OCD is equal to 57.5 mm and said second OCD is equal to 66.5 mm for glasses having a +1.375 Diopter power, and wherein said first OCD is equal to 57 mm and said second OCD is equal to 67 mm for glasses having a +1.25 Diopter power, and wherein said first OCD is equal to 56.5 mm and said second OCD is equal to 67.5 mm for glasses having a +1.125 Diopter power, and wherein said single OCD is equal to 62 mm for glasses having a +1.00 Diopter power or less.

* * * * *